(12) United States Patent
Yuasa et al.

(10) Patent No.: US 8,321,898 B2
(45) Date of Patent: Nov. 27, 2012

(54) CONTENT DISPLAY-PLAYBACK SYSTEM, CONTENT DISPLAY-PLAYBACK METHOD, AND RECORDING MEDIUM AND OPERATION CONTROL APPARATUS USED THEREWITH

(75) Inventors: Naoki Yuasa, Chiba (JP); Shuichi Otsu, Kanagawa (JP); Hideki Sato, Kanagawa (JP); Junichi Nakamura, Chiba (JP)

(73) Assignee: Sony Corporation, Tokyo (JP)

( * ) Notice: Subject to any disclaimer, the term of this patent is extended or adjusted under 35 U.S.C. 154(b) by 1368 days.

(21) Appl. No.: 11/432,399

(22) Filed: May 12, 2006

(65) Prior Publication Data

US 2006/0262221 A1 Nov. 23, 2006

(30) Foreign Application Priority Data

May 23, 2005 (JP) .................................. 2005-150222
Jan. 20, 2006 (JP) .................................. 2006-012946

(51) Int. Cl.
*H04N 7/18* (2006.01)

(52) U.S. Cl. ............ 725/82; 725/81; 725/115; 725/116; 725/117; 725/120; 725/123; 725/131; 725/139; 725/145; 725/146; 725/147; 725/151

(58) Field of Classification Search ........................ None
See application file for complete search history.

(56) References Cited

U.S. PATENT DOCUMENTS

| | | | |
|---|---|---|---|
| 5,598,522 A | 1/1997 | Inatomi | |
| 6,636,808 B1 | 10/2003 | Brown et al. | |
| 6,802,023 B2 | 10/2004 | Oldfield et al. | |
| 7,171,677 B1 * | 1/2007 | Ochiai | ............................. 725/80 |
| 2002/0029271 A1 | 3/2002 | Schwager | |
| 2003/0009760 A1 * | 1/2003 | Sakamoto et al. | ............... 725/74 |
| 2003/0107605 A1 | 6/2003 | Iwamura | |
| 2003/0192049 A1 * | 10/2003 | Schneider et al. | ............... 725/51 |

(Continued)

FOREIGN PATENT DOCUMENTS

EP 1051034 A1 * 11/2000

(Continued)

OTHER PUBLICATIONS

European Search Report issued Sep. 15, 2010 in corresponding European Application No. 06010668.

(Continued)

*Primary Examiner* — Dominic D Saltarelli
*Assistant Examiner* — Jason J Chung
(74) *Attorney, Agent, or Firm* — Oblon, Spivak, McClelland, Maier & Neustadt, L.L.P.

(57) ABSTRACT

A content display-playback system includes a content providing apparatus, a content display-playback apparatus, and an operation control apparatus for controlling the apparatuses. On the basis of operation control by the control apparatus, content is transmitted from the providing apparatus to the display-playback apparatus for display and playback through a network. The control apparatus includes an input operation receiving unit for receiving an operation input, a control signal generating unit for generating a control signal for transmitting and receiving the content among the providing, display-playback, and control apparatuses in response to the operation input, and a storage unit for storing selection-history information. When the receiving unit receives an operation input for transmitting the content from the providing apparatus to the display-playback apparatus, the generating unit generates a control signal for selecting a display-playback apparatus on the basis of the selection-history information and transmitting the content to the selected display-playback apparatus.

11 Claims, 18 Drawing Sheets

U.S. PATENT DOCUMENTS

| | | | |
|---|---|---|---|
| 2005/0028208 A1* | 2/2005 | Ellis et al. | 725/58 |
| 2005/0094031 A1* | 5/2005 | Tecot et al. | 348/473 |
| 2005/0155052 A1* | 7/2005 | Ostrowska et al. | 725/25 |
| 2005/0174489 A1 | 8/2005 | Yokoyama et al. | |
| 2009/0138922 A1* | 5/2009 | Thomas et al. | 725/87 |

FOREIGN PATENT DOCUMENTS

| | | |
|---|---|---|
| EP | 1 447 941 A2 | 8/2004 |
| EP | 1 447 941 A3 | 8/2004 |
| JP | 2002-333935 | 11/2002 |
| JP | 2003-333359 | 11/2003 |
| JP | 2004-94562 | 3/2004 |
| JP | 2005-11087 | 1/2005 |
| JP | 2005-94350 | 4/2005 |
| WO | WO 00/39964 A1 | 7/2000 |

OTHER PUBLICATIONS

Office Action issued Jun. 7, 2011, in Japan Patent Application No. 2006-012946.

* cited by examiner

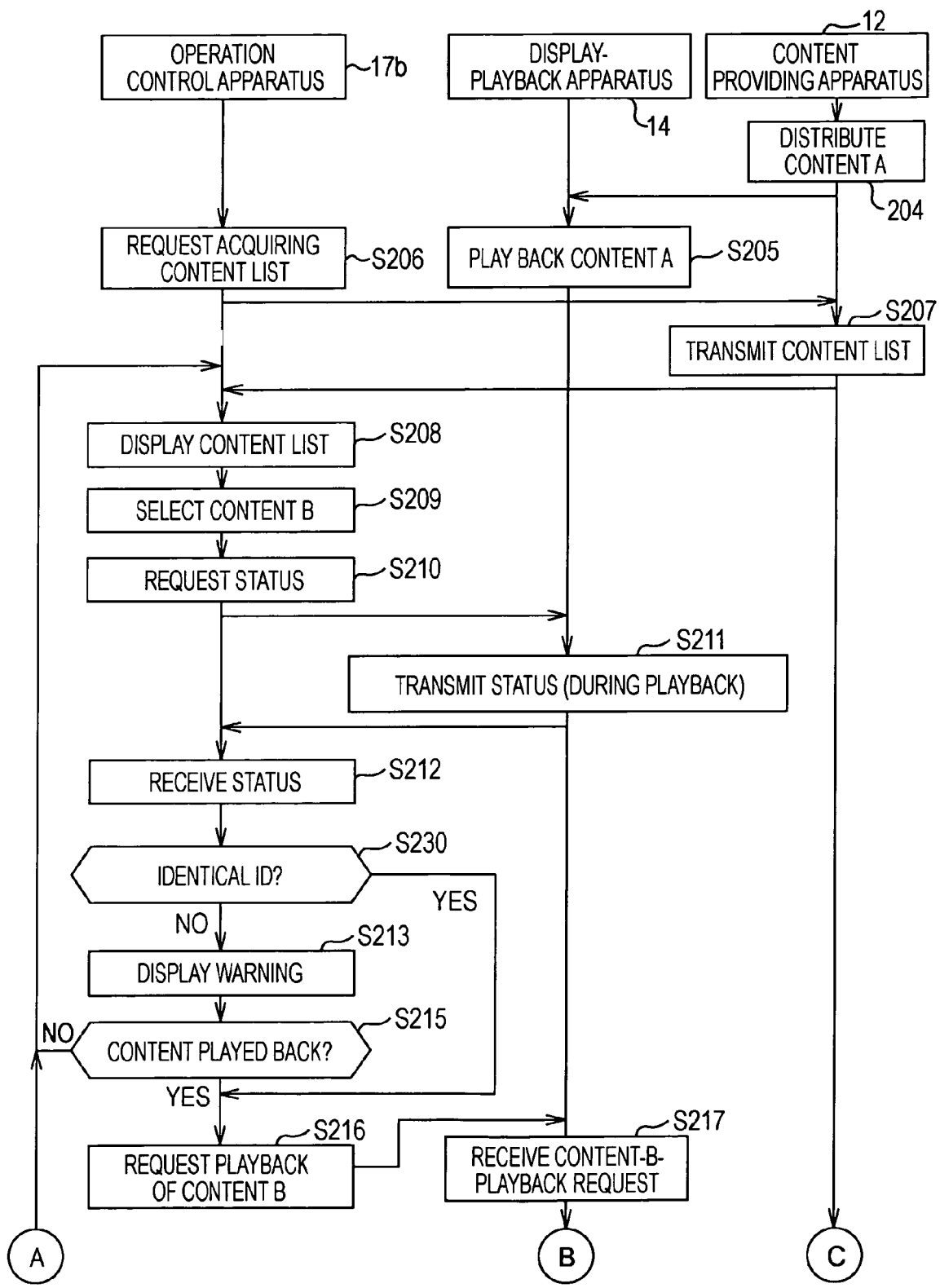

FIG. 17A

TV PROGRAM (DRAMA)
IS BEING PLAYED BACK.
WOULD YOU LIKE TO PLAY
BACK THIS CONTENT AFTER
STOPPING THE PRESENT
PLAYBACK?

[YES]  [NO]

FIG. 17B

RECEIVED CONTENT-B
PLAYBACK REQUEST.
WOULD YOU LIKE TO
PERMIT PLAYBACK?

[YES]  [NO]

FIG. 17C

REJECTED CONTENT-B
PLAYBACK REQUEST

CONTENT DISPLAY-PLAYBACK SYSTEM, CONTENT DISPLAY-PLAYBACK METHOD, AND RECORDING MEDIUM AND OPERATION CONTROL APPARATUS USED THEREWITH

CROSS REFERENCES TO RELATED APPLICATIONS

The present invention contains subject matter related to Japanese Patent Application JP 2005-150222 filed in the Japanese Patent Office on May 23, 2005, and Japanese Patent Application JP 2006-012946 filed in the Japanese Patent Office on Jan. 20, 2006, the entire contents of which are incorporated herein by reference.

BACKGROUND OF THE INVENTION

1. Field of the Invention

The present invention relates to a content display-playback system which includes a content providing apparatus, such as a server, for providing content, at least one display-playback apparatus for displaying and playing back content, and a operation control apparatus for controlling the apparatuses, and in which content is sent from the content providing apparatus to a content display-playback apparatus designated by the operation control apparatus through a network and the content is displayed and played back by the designated content display-playback apparatus, and to a content display-playback method therefor, and a recording medium having a program recorded thereon, and the operation control apparatus.

2. Description of the Related Art

Nowadays, with widespread use of VCRs (video cassette recorders) that record television broadcast programs on video cassettes, a viewing manner has become popular which is based on the concept of a so-called "time shift" in which a viewer views a television broadcast program in a viewer's convenient time different from a broadcast time of the program. In this viewing manner, many television broadcast programs are recorded, and are viewed with a time provided after the recording. In addition, in recent years, a recording medium has changed from a videocassette to a hard disk, thus making it possible to easily store more amounts of video data on the hard disk (storage device) without caring about the storage capacity of the hard disk. A video recorder of the above type which uses a hard disk is hereinafter referred to as a "DVR (digital video recorder)" unless otherwise indicated.

Recently, a content display-playback system has become known in which AV (audio-visual) content servers (content providing apparatuses), and display-playback apparatuses such as CRTs (cathode-ray tubes), LCDs (liquid crystal displays), and PDPs, are connected to wired or wireless networks established in homes, business places, areas, and, in addition, in global areas. In this content display-playback system, by connecting at least one DVR as described above, as an AV content server, to the network, for example, a recorded television broadcast program can be viewed at a place remote from the AV content server through the network.

A television receiver of the related art displays, on its display screen, an executable processing selecting menu in response to button operations on a remote controller (such as a remote control unit, operation control apparatus, or remote commander) for the television receiver. A user of the television receiver can perform desired processing such as image quality adjustment and timer setting by using the remote controller to select a desired type of processing and operating the remote controller in accordance with guidance or the like displayed on the display screen.

A receiver or the like, called a name such as "STB (set-top box)" or "IRD (integrated receiver decoder)", for receiving a satellite broadcast signal, displays data, such as an EPG (electronic program guide), on a display screen of a monitoring unit. In this case, a user of the receiver can change tuning channels by using a remote controller for the receiver to select a desired program to be viewed on the basis of the EPG displayed on the display screen of the monitoring unit.

As described above, in a television receiver and a television broadcast signal receiver, by combining remote control operations and displayed information such as a menu, a guidance, or an EPG, a desired type of processing can be clearly and relatively easily executed.

However, as described above, in order for the television receiver, the STB, or the IRD to perform a desired type of processing, when necessary information, such as a menu and guidance, is displayed on the display screen of the television receiver or the like, and the user operates the remote controller while viewing the displayed information, operations on the remote controller may become complicated.

For example, there may be cases in which page ejection of a menu needs to be performed a plural number of times in order to display, from among a plurality of menus, a menu including a desired type of processing as a selected item, in which a complicated operation needs to be performed on the remote controller in order to move a cursor on the display screen, and in which a determining operation needs to be performed by using the remote controller.

In addition, regarding a monitoring apparatus such as a television receiver, a type of monitoring apparatus increases in number which has portability and reduced size and weight achieved by using an LCD or the like, and which can be used at hand of the user. In this case, the remote controller for the television receiver is unnecessary. In addition, it is cumbersome to use a remote controller for an external input apparatus such as a receiving apparatus for supplying a video signal and an audio signal to the television receiver.

Accordingly, the assignee of the present invention has already proposed a bidirectional communication system having a configuration in which a display apparatus is used to enable viewing video information such as a television program, and listening to audio information, and which enables remote control of a base apparatus for supplying a video signal to the display apparatus and an external input apparatus connected to the base apparatus by using operating display information displayed on a display element of the display apparatus and a contact position detector such as a touch panel. In this configuration, the bidirectional communication system can perform remote control and can establish a home network having good usability without needing complicated operations. According to this bidirectional communication system, by using the operating display information displayed on the display element of the display apparatus and the contact position detector such as a touch panel, the base apparatus for supplying the video signal to the display apparatus and the external input apparatus connected to the base apparatus can be remote-controlled, whereby desired video can easily be selected and can be displayed on the display apparatus.

For example, the assignee of the present invention disclosed a content display-playback system and video display control apparatus (Japanese Unexamined Patent Application Publication No. 2003-333359) in which, by using a bidirectional communication system of the above type, a base apparatus supplies video signals to a plurality of display apparatuses.

The assignee of the present invention disclosed a technology (Japanese Unexamined Patent Application Publication No. 2002-333937) for improving convenience of an information processing apparatus. In this technology, to facilitate a user's manual operation, when an operation unit, such as a jog dial, is not operated, operation details are not unnecessarily displayed, and, when an operation on the jog dial is initiated, the operation details are displayed.

SUMMARY OF THE INVENTION

In a system in which content, such as video and audio, is displayed and played back by display-playback equipment having a video display function and/or audio playback function by using a network as described above, when the system includes a plurality of display-playback apparatuses as the equipment, it is necessary to designate which apparatus is used for display and playback.

When selective designation of one of the display-playback apparatuses is manually performed by a user, it is preferable to appropriately display a list of display-playback apparatuses. Also, when automatic display-playback-apparatus selection is performed, it is preferable that an appropriate display-playback apparatus be selected.

In addition, when the same display-playback apparatus are designated by a plurality of users, in a situation in which selection control is possible also from a remote place by using a network or the like, mediation (adjustment) among the users is difficult, even if no problem occurs in a situation in which mediation is easily performed by a direct conversation or the like between the users. Accordingly, there is a possibility that content being enjoyed by a previous user may be switched without any notice.

It is desirable to provide a content display-playback system which includes a content providing apparatus, at least one content display-playback apparatus, and an operation control apparatus for controlling the content providing apparatus and the content display-playback apparatus, in which, on the basis of operation control by the operation control apparatus, content is transmitted from the content providing apparatus to the content display-playback apparatus for display and playback through a network, in which, when a piece of content is selectively displayed and played back on the display-playback apparatus, selective designation of an appropriate display-playback apparatus is manually or automatically performed and a defective state generated when the same display-playback apparatus is selectively designated by a plurality of users is eliminated, and to provide a content display-playback method therefor, and a recording medium and operation control apparatus used therewith.

According to an embodiment of the present invention, there is provided a content display-playback system including a content providing apparatus, at least one content display-playback apparatus, and at least one operation control apparatus for controlling the content providing apparatus and the content display-playback apparatus, wherein, on the basis of operation control by the operation control apparatus, content is transmitted from the content providing apparatus to the content display-playback apparatus for display and playback through a network. The operation control apparatus includes an input operation receiving unit for receiving an operation input from a user, a control signal generating unit for generating a control signal for transmitting and receiving the content among the content providing apparatus, the content display-playback apparatus, and the operation control apparatus in response to the operation input received by the input operation receiving unit, and a storage unit for storing selection-history information of content display-playback apparatuses which display and play back content transmitted from the content providing apparatus by the control signal generating unit. When the input operation receiving unit receives an operation input for transmitting the content from the content providing apparatus to the content display-playback apparatus for display and playback, the control signal generating unit generates a control signal for selecting a predetermined content display-playback apparatus on the basis of the selection-history information stored in the storage unit and transmitting the content from the content providing apparatus to the selected content display-playback apparatus for display and playback.

According to another embodiment of the present invention, there is provided a content display-playback system including a content providing apparatus, a plurality of content display-playback apparatuses, and an operation control apparatus for controlling the content providing apparatus and the content display-playback apparatuses, wherein, on the basis of operation control by the operation control apparatus, content is transmitted from the content providing apparatus to each content display-playback apparatus for display and playback through a network. The operation control apparatus includes an input operation receiving unit for receiving an operation input from a user, a control signal generating unit for generating a control signal for transmitting and receiving the content among the content providing apparatus, the content display-playback apparatuses, and the operation control apparatus in response to the operation input received by the input operation receiving unit, a storage unit for storing selection-history information of content display-playback apparatuses which display and play back content transmitted from the content providing apparatus by the control signal generating unit, and a display unit. When the input operation receiving unit receives an operation input for transmitting the content from the content providing apparatus to one content display-playback apparatus for display and playback, on the basis of the selection-history information stored in the storage unit, the display unit displays a list of content display-playback apparatuses arranged in order of frequency of being selected.

According to another embodiment of the present invention, there is provided a content display-playback method for a system which includes a content providing apparatus, at least one content display-playback apparatus, and an operation control apparatus for controlling the content providing apparatus and the content display-playback apparatus, and in which, on the basis of operation control by the operation control apparatus, content is transmitted from the content providing apparatus to the content display-playback apparatus for display and playback through a network. The operation control by the operation control apparatus includes the steps of receiving an operation input from a user, generating a control signal for transmitting and receiving the content among the content providing apparatus, the content display-playback apparatus, and the operation control apparatus in response to the operation input received in the input operation receiving step, and storing selection-history information of content display-playback apparatuses which display and play back content transmitted from the content providing apparatus in the control signal generating step. When an operation input for transmitting the content from the content providing apparatus to the content display-playback apparatus for display and playback is received in the input operation receiving step, in the control signal generating step, a control signal for selecting a predetermined content display-playback apparatus on the basis of the selection-history information stored in the storage unit and transmitting the content from the content providing apparatus to the selected content display-playback apparatus for display and playback is generated.

According to another embodiment of the present invention, there is provided a content display-playback method for a system which includes a content providing apparatus, a plurality of content display-playback apparatuses, and an operation control apparatus for controlling the content providing apparatus and the content display-playback apparatuses, and in which, on the basis of operation control by the operation control apparatus, content is transmitted from the content providing apparatus to each content display-playback apparatus for display and playback through a network. The operation control by the operation control apparatus includes the steps of receiving an operation input from a user, generating a control signal for transmitting and receiving the content among the content providing apparatus, the content display-playback apparatuses, and the operation control apparatus in response to the operation input received in the input operation receiving step, storing selection-history information of content display-playback apparatuses which display and play back content transmitted from the content providing apparatus in the control signal generating step, and performing displaying on a display unit of the operation control apparatus. When an operation input for transmitting the content from the content providing apparatus to one content display-playback apparatus for display and playback is received in the input operation receiving step, in the displaying step, a list of content display-playback apparatuses arranged in order of frequency of being selected is displayed on the basis of the selection-history information stored in the storing step.

According to another embodiment of the present invention, there is provided a recording medium having a content display-playback program recorded thereon for displaying and playing back content in a system which includes a content providing apparatus, at least one content display-playback apparatus, and an operation control apparatus for controlling the content providing apparatus and the content display-playback apparatus, and in which, on the basis of operation control by the operation control apparatus, content is transmitted from the content providing apparatus to the content display-playback apparatus for display and playback through a network. The operation control by the operation control apparatus includes the steps of receiving an operation input from a user, generating a control signal for transmitting and receiving the content among the content providing apparatus, the content display-playback apparatus, and the operation control apparatus in response to the operation input received in the input operation receiving step, and storing selection-history information of content display-playback apparatuses which display and play back content transmitted from the content providing apparatus in the control signal generating step. When an operation input for transmitting the content from the content providing apparatus to the content display-playback apparatus for display and playback is received in the input operation receiving step, in the control signal generating step, a control signal for selecting a predetermined content display-playback apparatus on the basis of the selection-history information stored in the storing step and transmitting the content from the content providing apparatus to the selected content display-playback apparatus for display and playback is generated.

According to another embodiment of the present invention, there is provided an operation control apparatus for use in a system for transmitting content from a content providing apparatus to at least one content display-playback apparatus for display and playback through a network. The operation control apparatus includes an input operation receiving unit for receiving an operation input from a user, a control signal generating unit for generating a control signal for transmitting and receiving the content among the content providing apparatus, the content display-playback apparatuses, and the operation control apparatus in response to the operation input received by the input operation receiving unit, and a storage unit for storing selection-history information of content display-playback apparatuses which display and play back content transmitted from the content providing apparatus by the control signal generating unit. When the input operation receiving unit receives an operation input for transmitting the content from the content providing apparatus to the content display-playback apparatus for display and playback, the control signal generating unit generates a control signal for selecting a predetermined content display-playback apparatus on the basis of the selection-history information stored in the storage unit and transmitting the content from the content providing apparatus to the selected content display-playback apparatus for display and playback.

According to another embodiment of the present invention, there is provided a content display-playback system including a content providing apparatus, a content display-playback apparatus, and an operation control apparatus for controlling the content providing apparatus and the content display-playback apparatus, wherein, on the basis of operation control by the operation control apparatus, content is transmitted from the content providing apparatus to the content display-playback apparatus for display and playback through a network. The operation control apparatus includes an input operation receiving unit for receiving an operation input from a user, and a control signal generating unit for generating a control signal for transmitting and receiving the content among the content providing apparatus, the content display-playback apparatus, and the operation control apparatus in response to the operation input received by the input operation receiving unit. The content display-playback apparatus includes control means in which, when the operation control apparatus performs a playback-control operation for requesting the content display-playback apparatus to perform playback, determining whether to be controlled by the playback-control operation depending on at least a present operating state of the content display-playback apparatus.

According to another embodiment of the present invention, there is provided a content display-playback apparatus for displaying and playing back content received from a content providing apparatus through a network on the basis of operation control by an operation control apparatus. The content display-playback apparatus includes control means in which, when the operation control apparatus performs a playback-control operation for requesting the content display-playback apparatus to perform playback, determining whether to be controlled by the playback-control operation depending on at least a present operating state of the content display-playback apparatus.

According to an embodiment of the present invention, a previously selected content display-playback apparatus is automatically selected on the basis of selection-history information of selection of content display-playback apparatuses, or a content display-playback apparatus having the highest frequency of being selected in the past is automatically selected, whereby automatic selection of a content display-playback apparatus which matches user's intention. Also, when a content display-playback apparatus is manually selected by a user, a list of content display-playback apparatuses arranged in order of frequency of being selected in the past is displayed on the basis of the selection-history information. This enables manual selection of a content display-playback apparatus which matches user's intention.

In addition, when an operation control apparatus performs a playback control operation on a content display-playback apparatus in a state of performing display and playback, it is determined whether the playback control operation is received, and a warning is displayed, whereby mediation between users can easily be performed.

BRIEF DESCRIPTION OF THE DRAWINGS

FIG. 16A is a flowchart showing the first half of a specific example process of selection of a display-playback apparatus by an operation control apparatus;

FIGS. 17A, 17B, and 17C are illustrations of examples of displayed warnings associated with the process shown in FIGS. 16A and 16B.

DESCRIPTION OF THE PREFERRED EMBODIMENTS

Embodiments of the present invention are described below with reference to the accompanying drawings.

Figure 1:
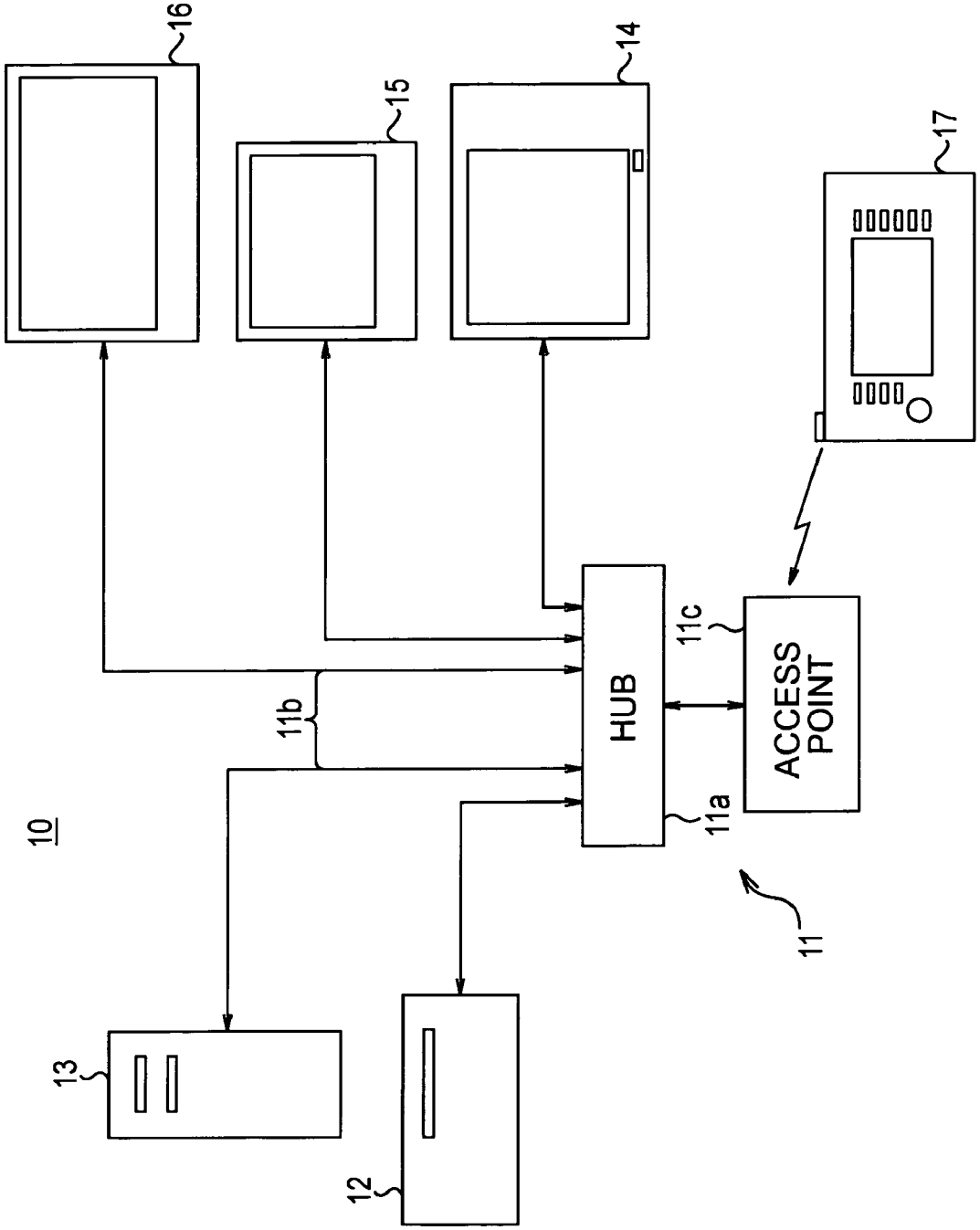
FIG. 1 is a block diagram showing a content display-playback system.

FIG. 1 is a block diagram showing the configuration of a content display-playback system 10 to which an embodiment of the present invention is applied. In the content display-playback system 10, two content providing apparatuses 12 and 13, whose specific examples are AV content servers such as DVRs, and three display-playback apparatuses 14, 15, and 16 which have display elements such as CRTs, LCDs, PDPs (plasma display panels) for displaying video and which play back audio associated with the video are connected to a home network 11 formed by combining a wireless network and a wired network. In addition, an operation control apparatus 17 for controlling operations on each content providing apparatus and each display-playback apparatus is connected to the home network 11.

The home network 11 is an in-home digital network. The home network 11 connects the two content providing apparatuses 12 and 13, and the three display-playback apparatuses 14 to 16, as described above, by a wire cable 11b based on, for example, IEEE 1394, through a hub 11a. In addition, in the home network 11, an access point 11c is linked to the hub 11a, and the operation control apparatus 17 is wirelessly linked by using a predetermined protocol such as the IEEE 802.11 protocol or an extended protocol thereof. Accordingly, the operation control apparatus 17 is connected to the content providing apparatuses 12 and 13, and display-playback apparatuses 14 to 16 which are connected to the home network 11, and can control operations of them.

Figure 2:
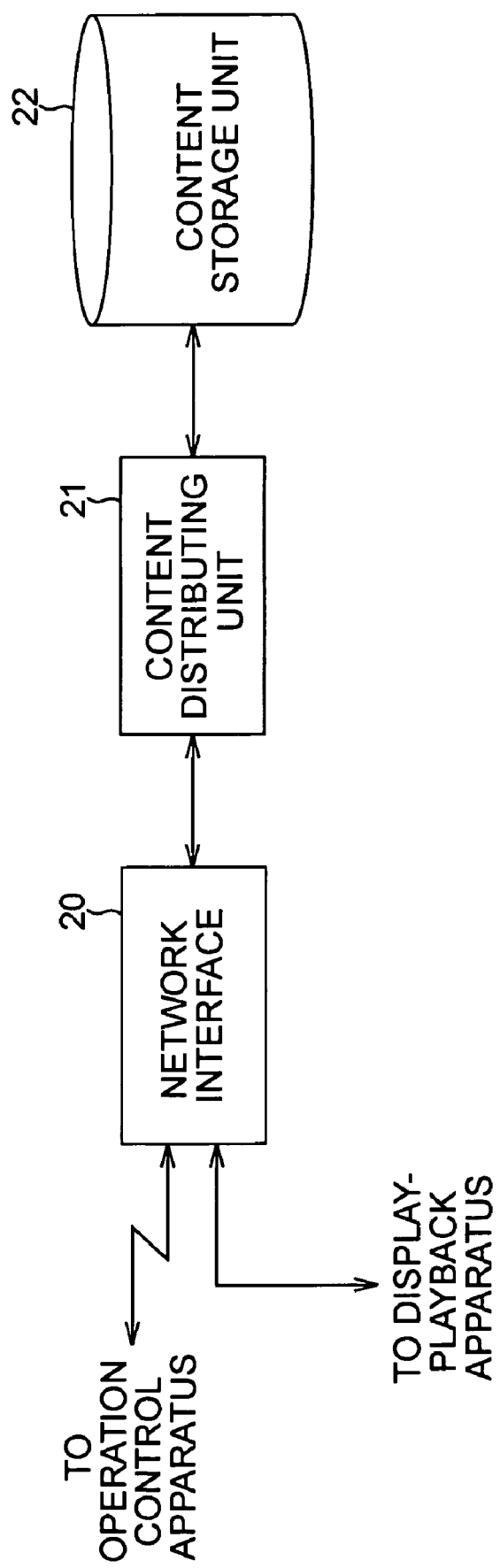
FIG. 2 is a block diagram showing a content providing apparatus.

FIG. 2 is a functional block diagram showing the content providing apparatus 12. This also applies to the content providing apparatus 13. The content providing apparatus 12 is an AV content server such as the above DVR. The content providing apparatus 12 includes a network interface 20, a content distributing unit 21, and a content storage unit 22.

In the content providing apparatus 12 in the content display-playback system 10, video and audio content (hereinafter referred to as "content"), received in a home through BS (broadcasting satellite) digital broadcasting, CS (communication satellite) digital broadcasting, analog terrestrial broadcasting, and the Internet, is stored as streaming data in the content storage unit 22, which is formed by a mass storage medium such as a hard disk. In the content providing apparatus 12, the content distributing unit 21 can read and play back the streaming data stored in the content storage unit 22 in response to a distribution request transmitted from the operation control apparatus 17 through the network interface 20, and can distribute the played-back data by streaming through the network interface 20 to one display-playback apparatus or the operation control apparatus 17, which sends the request.

Figure 3:
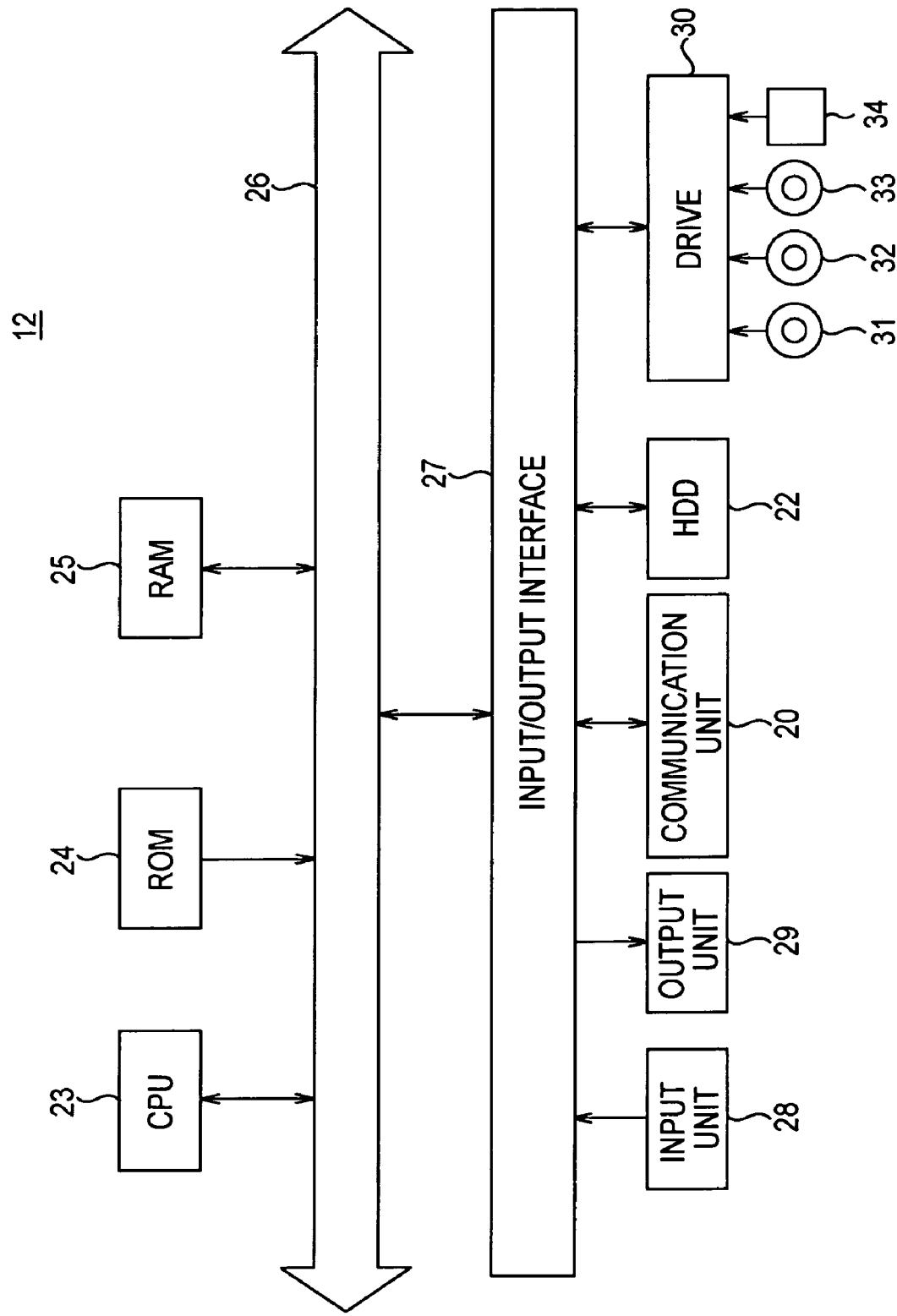
FIG. 3 is a block diagram showing the hardware of the content providing apparatus.

FIG. 3 is a block diagram showing an example of the hardware configuration of the content providing apparatus 12. A CPU 23 executes various types of processing in accordance with a server program stored in a ROM (read-only memory) 24 or a server program loaded from an HDD (hard disk drive) 22 to a RAM 25. The RAM 25 also stores data, etc., which are necessary for the CPU 23 to execute the various types of processing.

The CPU 23, the ROM 24, and the RAM 25 are connected to one another by a bus 26. The bus 26 connects to an input/output interface 27.

The input/output interface 27 connects an input unit 28 including a button, a switch, a keyboard, and a mouse, an output unit 29 including a display such as a CRT or LCD, and a speaker, a communication unit 20 serving as the network interface 20 and including a modem and a terminal adapter, and the HDD 22 serving as the content storage unit 22.

The network interface 20 performs communication through the home network 11. In the content display-playback system 10, the communication units 20 of the content providing apparatuses 12 and 13 are connected to the access point 11c for a wireless LAN (local area network) by wires 11b through the hub 11a. The content providing apparatuses 12 and 13 are also connected to the three display-playback apparatuses 14 to 16 by wires 11b through the hub 11a. Thus, the content providing apparatuses 12 and 13 are linked to the operation control apparatus 17 on a wireless communication path in the home network 11 through the network interface 20, and are connected to the display-playback apparatuses 14 to 16 on wired communication paths formed by the wires 11b. The access point 11c for the wireless LAN and the operation control apparatus 17 (described later) perform wireless communication in accordance with a predetermined protocol such as the IEEE 802.11 protocol or an extended protocol thereof.

The content storage unit 22 stores not only a server program but also media data for streaming distribution.

A drive 30 is connected to the input/output interface 27, if necessary, and a magnetic disk 31, an optical disk 32, a magneto-optical disc 33, a semiconductor memory 34, or the like, is loaded into the drive 30, if necessary. A computer program (such as a server program) read from such a medium is installed in the HDD 22, if necessary.

In a relationship with the functional block diagram shown in FIG. 2, the blocks shown FIG. 3 are as follows: the network interface 20 functions as the network interface 20, and the HDD 22 functions as the content storage unit 22. The media 31 to 34, etc., which are connected to the CPU 23, the ROM 24, the RAM 25, and the drive 30, each function as the content distributing unit 21.

Thus, on the basis of the hardware configuration, an operation of the content providing apparatus 12 is described below. The content providing apparatus 12 is a computer and its CPU 23 executes distributing streaming data on the basis of the server program. For example, the content providing apparatus 12 stores data of various media in the HDD 22. When being requested to distribute, by streaming, data of a predetermined medium through the home network 11, the content providing apparatus 12 reads corresponding content data, generates predetermined packets for performing streaming distribution, and distributes the packets through the home network 11.

Figure 4:
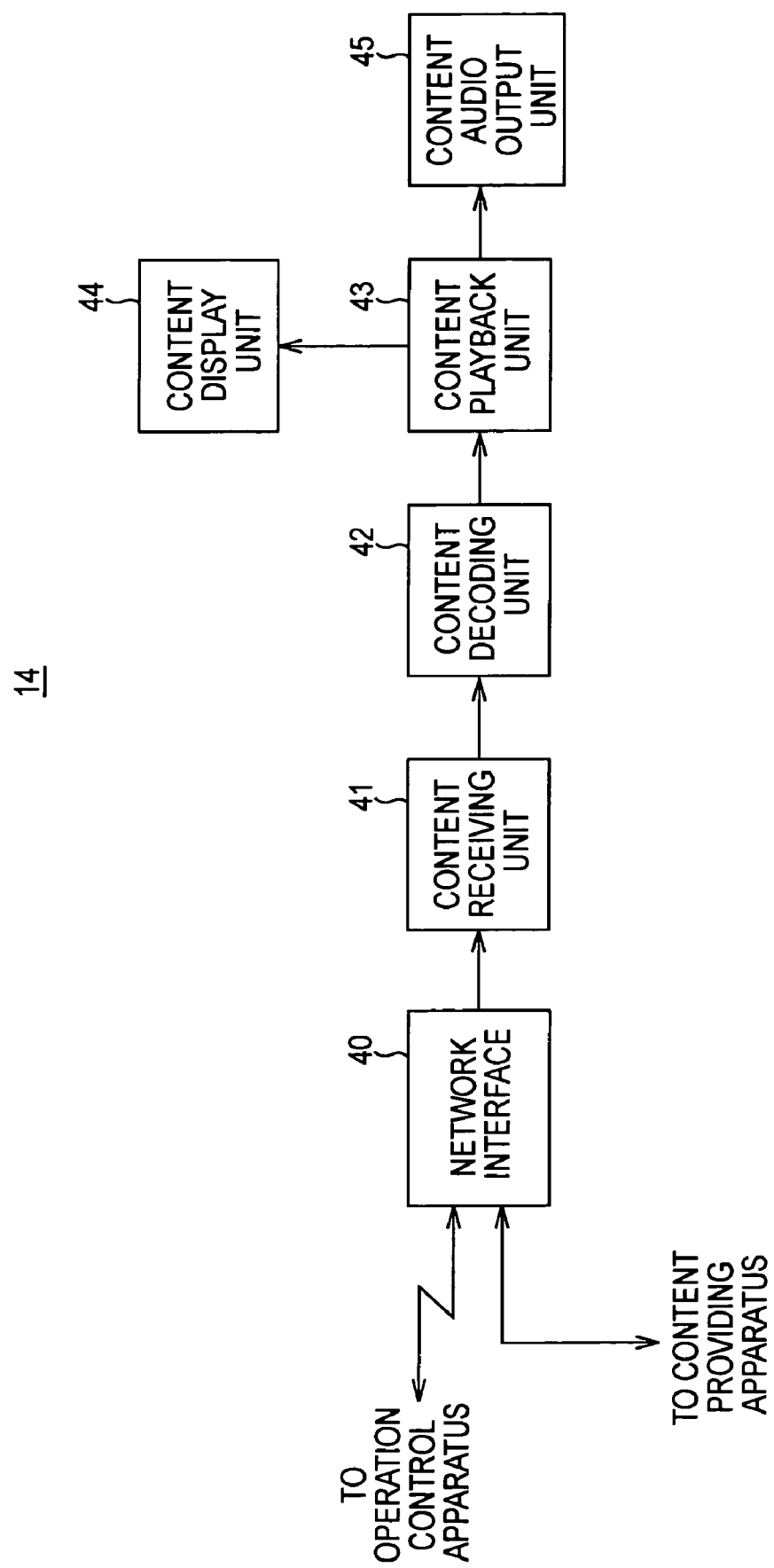
FIG. 4 is a functional block diagram showing a display-playback apparatus.

FIG. 4 is a functional block diagram showing each of the display-playback apparatuses 14 to 16. For example, the display-playback apparatus 14 has a streaming playback function capable of receiving streaming data distributed by streaming from the content providing apparatus 12 or 13 and displaying video by playing back the received data on an LCD or CRT, and outputs, from a speaker, audio by playing back audio data associated with the video. The display-playback apparatus 14 includes a network interface 40 for establishing connection to the home network 11, a content receiving unit 41 for receiving streaming data (content data) through the network interface 40, a content decoding unit 42 for decoding the content data, a content playback unit 43 for playing back the content data decoded by the content decoding unit 42, a content display unit 44 for displaying video of the played-back content, and a content audio output unit 45 for outputting audio of the played-back content.

The display-playback apparatus 14 operates as a streaming playback functional unit by using the above functional units in the following manner. The network interface 40 is used to establish connection to the home network 11, and the network interface 40 is used to receive the streaming data (content data). The content decoding unit 42 is used to decode the content data, and the content playback unit 43 is used to play back the content data played back by the content decoding unit 42. The content display unit 44 is used to display video of the content played back by the content display unit 44 and the content audio output unit 45 is used to output audio associated with the video.

Figure 5:
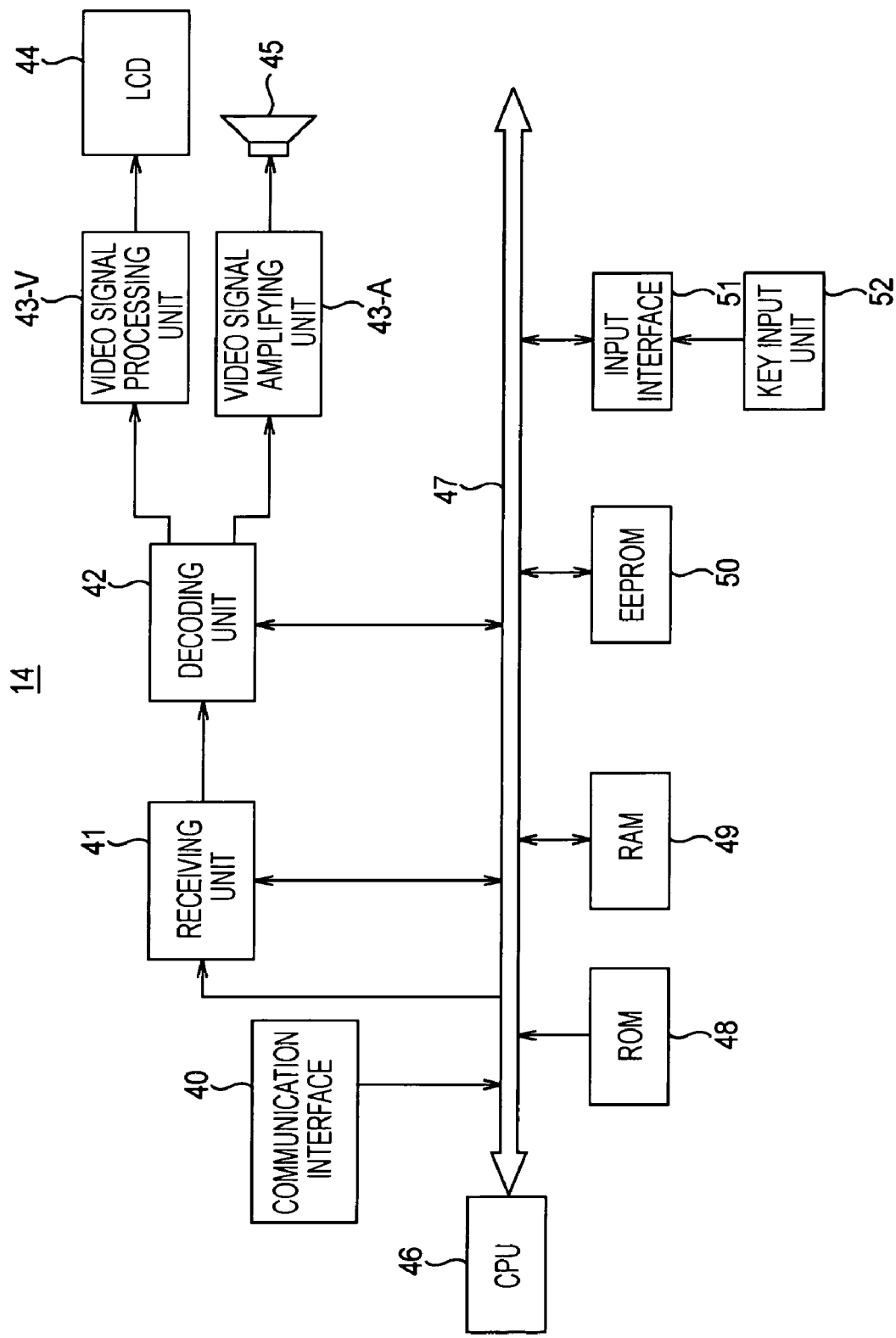
FIG. 5 is a block diagram showing the hardware of the display-playback apparatus.

FIG. 5 is a block diagram showing an example of the hardware configuration of each of the display-playback apparatuses 14 to 16. The display-playback apparatus 14 includes, for example, a communication interface 40, a receiving unit 41, a decoding unit 42, a video signal processing unit 43-V, an audio signal amplifying unit 43-A, and a speaker 45. The functional units of the display-playback apparatus 14 can be controlled by a controller mainly having a CPU 46. The controller is a microcomputer including the CPU 46, a ROM 48, a RAM 49, and an EEPROM 50 which are connected to one another by a CPU bus 47. The CPU 46 is connected to a key input unit 52 by an input interface 51, and receives an operation signal representing an operation such as sound volume adjustment, image quality adjustment, or power-on/off.

The ROM 48 stores various types of processing programs which are executed by the display-playback apparatus 14, or the like, and data necessary for processing. The RAM 49 is used mainly as a work area for various types of processing in a manner such as temporarily storing data obtained by various types of processing.

The EEPROM 50 is a so-called "nonvolatile memory" in which, even if its power is turned off, stored information is not lost, and, for example, various types of parameters, etc., can be stored.

The communication interface 40 performs communication through the home network 11. In the content display-playback system 10, the communication interface 40 of the display-playback apparatus 14 is connected to the access point 11c for the wireless LAN by the wire 11b through the hub 11a. The network interface 40 is connected to the content providing apparatuses 12 and 13 by the wires 11b through the hub 11a. Hence, the display-playback apparatuses 14 to 16 are linked to the operation control apparatus 17 on wireless communication paths in the home network 11 through their communication interfaces 40, and are connected to the content providing apparatuses 12 and 13 on wired communication paths formed by the wires 11b.

The content receiving unit 41 performs processing, such as decoding, on a supplied signal, and supplies the decoded signal to the decoding unit 42 (decompressing unit). The content providing apparatuses 12 and 13 transmit data obtained by compressing information signals such as display data, such as text data and video data of a terrestrial broadcast program, audio data, or video and audio signals of a satellite broadcast program.

Accordingly, after the decoding unit 42 of the display-playback apparatus 14 receives the decoded signal from the content receiving unit 41 which represents the compressed data, the decoding unit 42 separates the received signal into a video signal and an audio signal, and restores the original signals prior to data compression by decompressing the separated signals.

The decoding unit 42 generates an analog video signal and an analog audio signal by performing digital-to-analog (A/D) conversion on the restored video and audio signals. The decoding unit 42 supplies the analog audio signal to the video signal processing unit 43-V and supplies the analog audio signal to the audio signal amplifying unit 43-A.

The video signal processing unit 43-V generates a display signal on the basis of the video signal supplied from the decoding unit 42, and supplies the display signal to the content display unit 44 as an LCD. This allows a display screen of the LCD 44 to display video corresponding to the video signal transmitted from the content providing apparatus 12 or 13.

The audio signal amplifying unit 43-A amplifies the supplied audio signal to a predetermined level and supplies the amplified audio signal to the content audio output unit 45 as a speaker. This allows the speaker 45 to emit audio that is associated with the video signal transmitted from the content providing apparatus 12 or 13.

As described above, after receiving and playing back video and audio signals, such as a television broadcast program, transmitted from the content providing apparatus 12 or 13, each of the display-playback apparatuses 14 to 16 can output the played-back video and audio signals, whereby the video and audio signals can be provided to the user.

Figure 6:
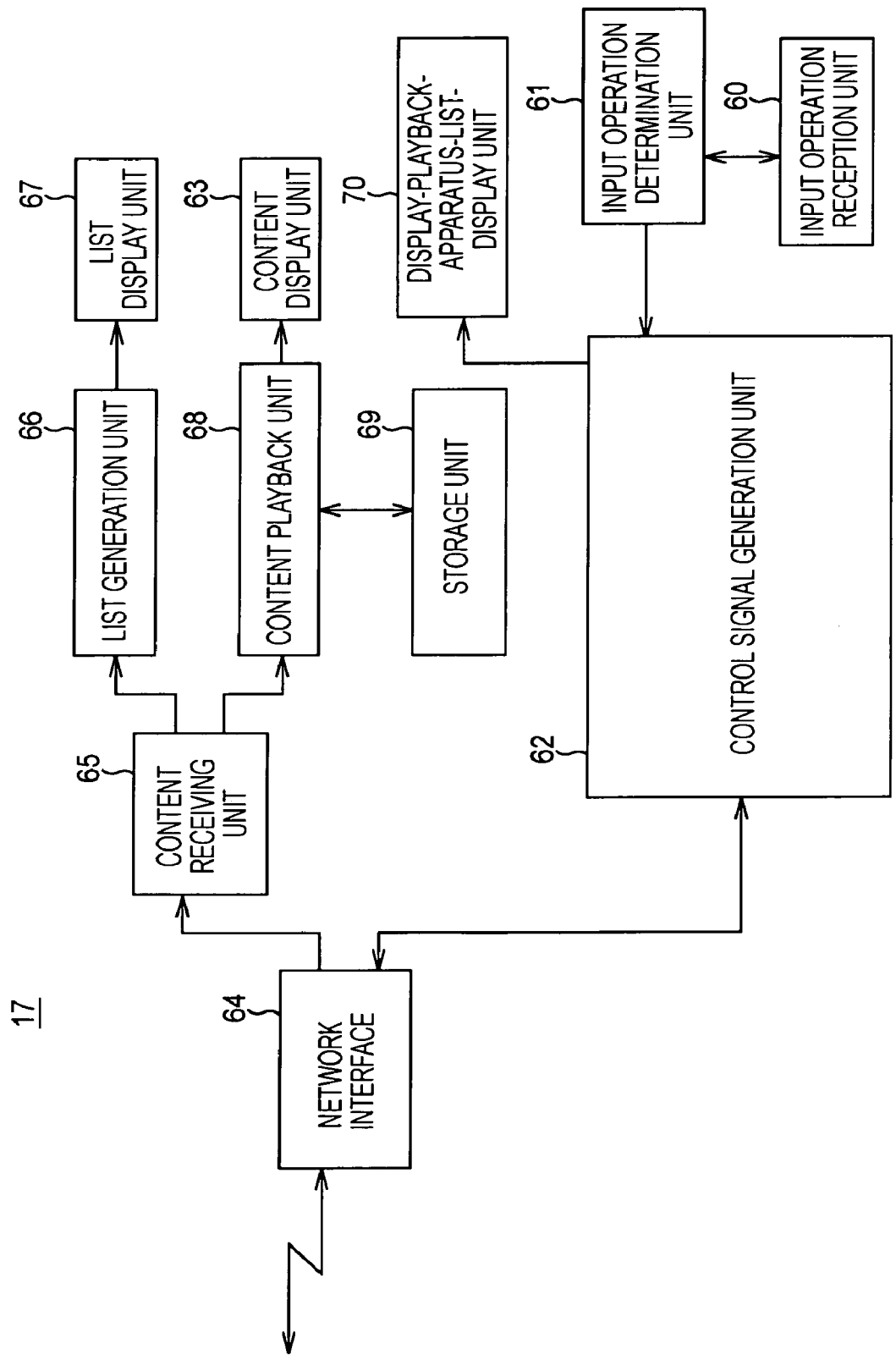
FIG. 6 is a functional block diagram showing an operation control apparatus.

FIG. 6 is a functional block diagram of the operation control apparatus 17. The operation control apparatus 17 is a remote controller for controlling operations on the content providing apparatuses 12 and 13, and display-playback apparatuses 14 to 16 which are connected to the home network 11. The operation control apparatus 17 has a display device such as an LCD, and can receive and play back AV content distributed by streaming from the content providing apparatuses 12 and 13. In other words, the operation control apparatus 17 has both an AV content streaming playback function and a function of controlling the content providing apparatuses 12 and 13, and display-playback apparatuses 14 to 16 which are connected to the home network 11.

Specifically, the operation control apparatus 17 controls transmission and reception of video information between the apparatuses including the operation control apparatus 17 itself, and controls display of video and playback of audio in the display-playback apparatuses 14 to 16 and the operation control apparatus 17 itself. Accordingly, the operation control apparatus 17 includes an input operation reception unit 60 for receiving an operation input from the user, a control signal generation unit 62 whose one function is a video-information-transmission/reception-signal generating function for generating an operation signal for transmitting video information among the apparatuses in response to the operation input, and a content display unit 63 for displaying video information played back by streaming in response to the operation signal generated by the control signal generation unit 62. In addition, the operation control apparatus 17 has an audio playback function (described later) for playing back audio information, and includes a built-in speaker and headphone terminal through which reproduced sounds can be heard. The operation control apparatus 17 in this embodiment can also be used as a display-playback apparatus that displays and plays back content.

The operation control apparatus 17 also includes a network interface 64 for performing wireless communication with the access point 11c for the wireless LAN on the home network 11 in accordance with a predetermined protocol such as the IEEE 802.11 protocol or an extended protocol thereof. The operation control apparatus 17 also includes a content receiving unit 65 which receives content information stored in the content providing apparatuses 12 and 13 and which performs processing, such as demodulation, on the received information.

The operation control apparatus 17 also includes a list generation unit 66 for generating a content list from the content information received and demodulated by the content receiving unit 65, and a list display unit 67 for displaying the content list generated by the list generation unit 66. The operation control apparatus 17 also includes a content playback unit 68 for playing back content data obtained such that the content receiving unit 65 receives and demodulates the content information, and a storage unit 69 for storing the content data to be played back by the content playback unit 68. The content data played back by the content playback unit 68 is displayed as video by the content display unit 63.

The operation control apparatus 17 includes an input operation determination unit 61 between the input operation reception unit 60 and the control signal generation unit 62. The input operation determination unit 61 determines a type of an input operation received by the input operation reception unit 60.

The control signal generation unit 62 generates various control signals on the basis of determination results by the input operation determination unit 61 for key input operations such as pressing, rotating, pushing-up, and pushing-down of an operation key or the like of the input operation reception unit 60 by the user. Specific examples of the generated control signals include a throw operation signal for allowing a desired display-playback apparatus to play back, by streaming, content data stored in a desired content providing apparatus. The specific examples include a catch operation signal for allowing the content display unit 63 of the operation control apparatus 17 to display content data being displayed on a display-playback apparatus. The specific examples include a reproducing operation signal for reproducing content data in the storage unit 69 when the catch operation is performed.

In addition, the control signal generation unit 62 generates a content provision selecting signal for selecting the content providing apparatus 12 or 13 on the basis of a user's input operation. The control signal generation unit 62 also generates a content selecting signal for selecting desired content. The content selecting signal is generated by the list generation unit 66 from the content information received by the content receiving unit 65 and is generated in response to an operation of the user, who views the content list displayed on the list display unit 67. The control signal generation unit 62 also generates a display-playback-apparatus selecting signal for selecting one of the display-playback apparatuses 14 to 16. The display-playback-apparatus selecting signal is generated in response to an operation of a user, who views a display-playback-apparatus list displayed on the display-playback-unit/list-display unit 70.

Obviously, the control signal generation unit 62 generates, not only playback operation signals for playing back, stopping, and pausing content on the content display unit 63 of the operation control apparatus 17 itself, but also operation signals such as starting, stopping, and pausing playback of the content in each of the display-playback apparatuses 14 to 16 in which displaying is selected.

Figure 7:
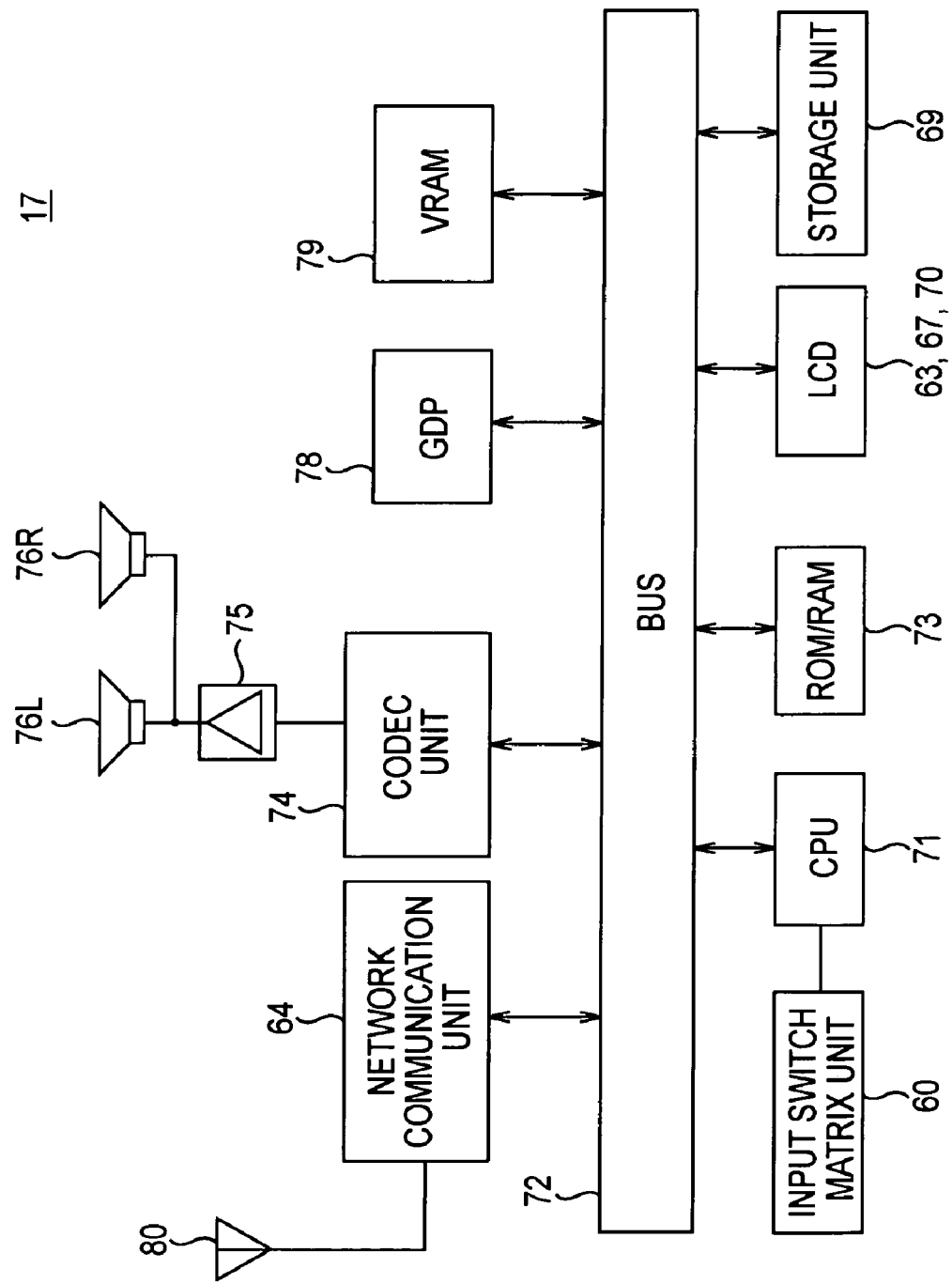
FIG. 7 is a block diagram showing the hardware of the operation control apparatus.

FIG. 7 is a block diagram showing an example of the hardware configuration of the operation control apparatus 17. In the operation control apparatus 17, a CPU 71 is connected to a network interface 64, a codec processing unit 74, and a GDP 78 through a bus 72. Also, the CPU 71 is connected to a ROM/RAM 73, an LCD 63, and the storage unit 69. The CPU 71 connects to an input switch matrix unit as the input switch matrix unit 60.

The network communication unit 64 performs wireless communication with the access point 11c for the wireless LAN through an antenna 80 in accordance with a predetermined protocol such as the IEEE 802.11 protocol or an extended protocol thereof.

In wireless communication by the network communication unit 64, the CPU 71 functions as the control signal generation unit 62 in response to a user's input operation using the input operation unit (input switch matrix unit) 60, whereby each generated control signal can be transmitted to the content providing apparatuses 12 and 13, or display-playback apparatuses 14 to 16 which are connected to the home network 11 through the access point 11c. The CPU 71 can also receive response signals from the apparatuses.

The ROM 73 stores a content display-playback program according to an embodiment of the present invention which is to be executed by the operation control apparatus 17, various types of processing programs, and data necessary for processing. The RAM 73 is used mainly as a work area for various types of processing in a manner such as temporarily storing data obtained by various types of processing.

Obviously, the operation control apparatus 17 may include an EEPROM as a nonvolatile memory. By including this EEPROM, in the operation control apparatus 17, stored information is not lost even if its power is turned off, for example, various types of parameters, etc., can be stored.

The storage unit 69 is a memory that stores content data distributed by streaming from the content providing apparatus 12 or 13, for example, at the time of the catch function. The storage unit 69 may be a semiconductor memory or HDD.

The codec processing unit 74 decodes the video data and audio data that are separated under the control of the CPU 71 after being distributed by streaming through the control signal generation unit 62. Video signal processing is implemented on the decoded video information by the GDP 78 and is displayed on the LCD 63. In addition, the audio information is amplified by an amplifier 75, and sounds of the amplified audio information is sent and emitted from two-channel stereo speakers 76L and 76R. Alternatively, the sounds may be listened to by using a pair of headphones (not shown) connected through a headphone terminal or an earphone (not shown).

The operation control apparatus 17 in this embodiment can be used not only as a so-called "remote controller" but also as a display-playback apparatus capable of displaying and playing back content.

Figure 8:
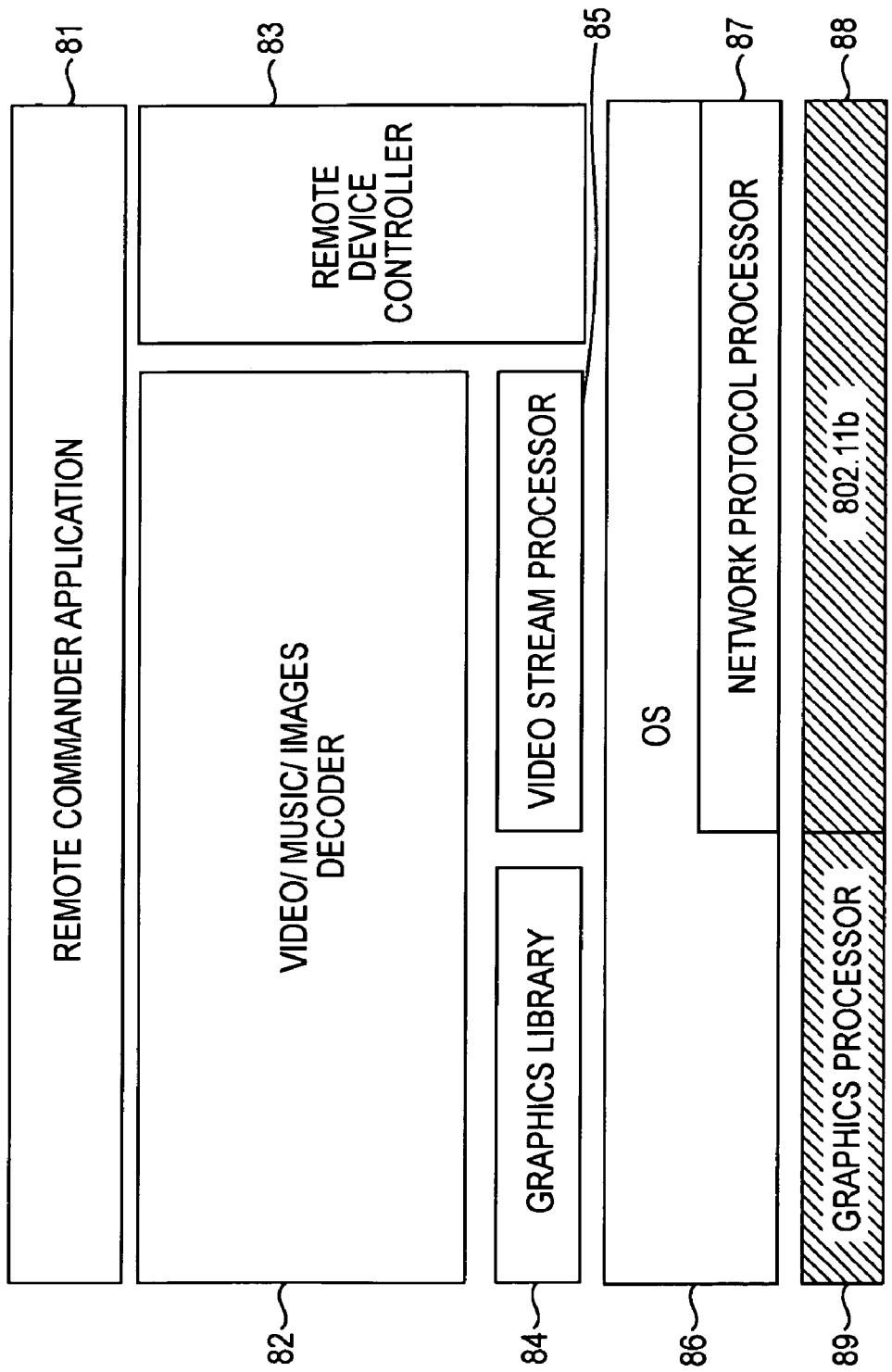
FIG. 8 is an illustration of software of the operation control apparatus.

FIG. 8 is a block diagram of software that is executed by the CPU 71 of the operation control apparatus 17 in the above hardware configuration. This software configuration includes a remote commander application 81 for generating remote control signals and controlling the content providing apparatuses 12 and 13, and the display-playback apparatuses 14 to 16. In addition, a video/music/image decoder 82, a remote device controller 83, a graphics library 84, and a video stream processor 85 are executed on the basis of an OS (operating system) 86. A network protocol processor 87 executes an IEEE 802.11b wireless protocol 88. A graphics processor 89 is controlled by the GDP 78 to operate.

Figure 9:
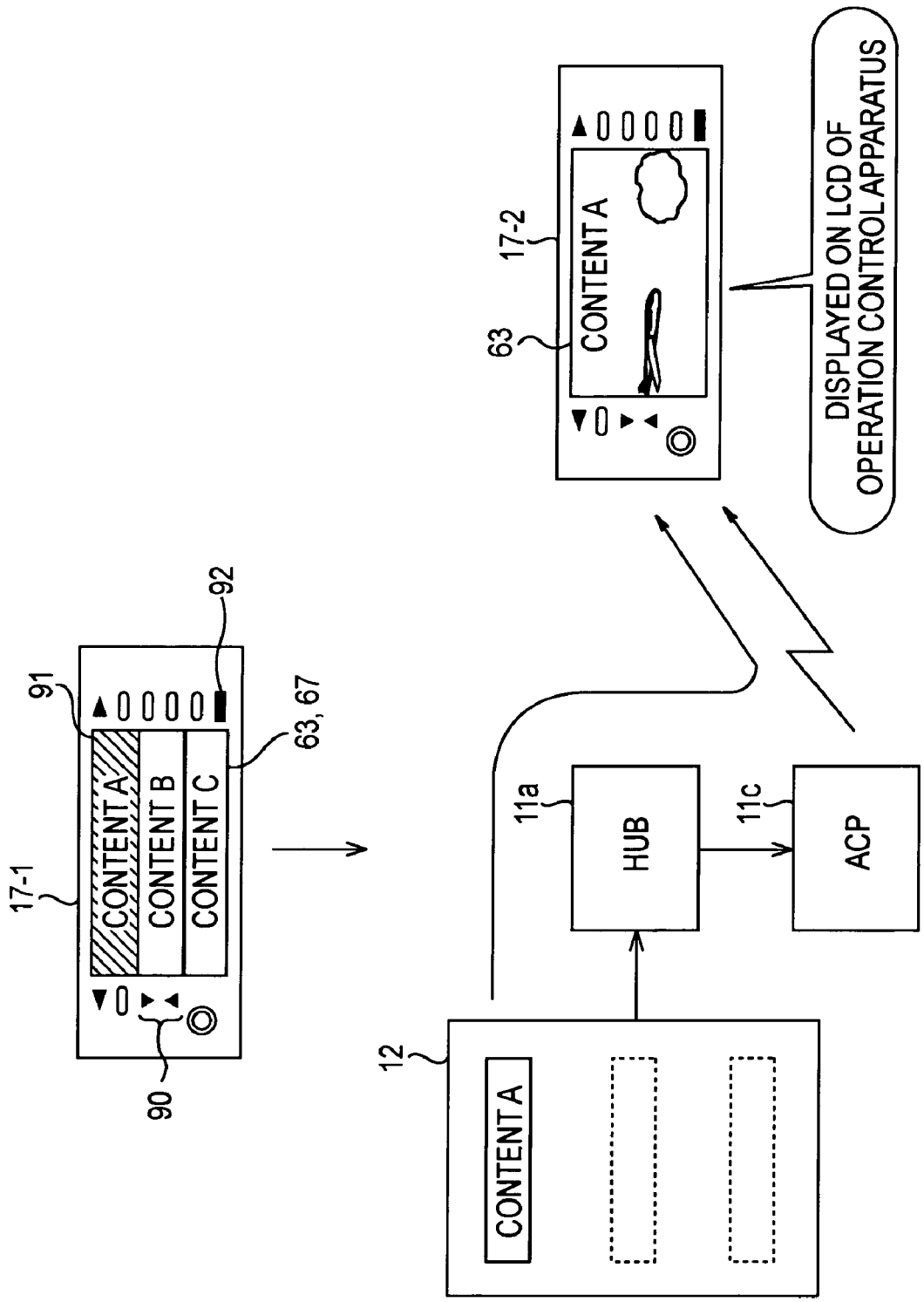
FIG. 9 is an illustration of a display-playback process of the operation control apparatus.
Figure 10:
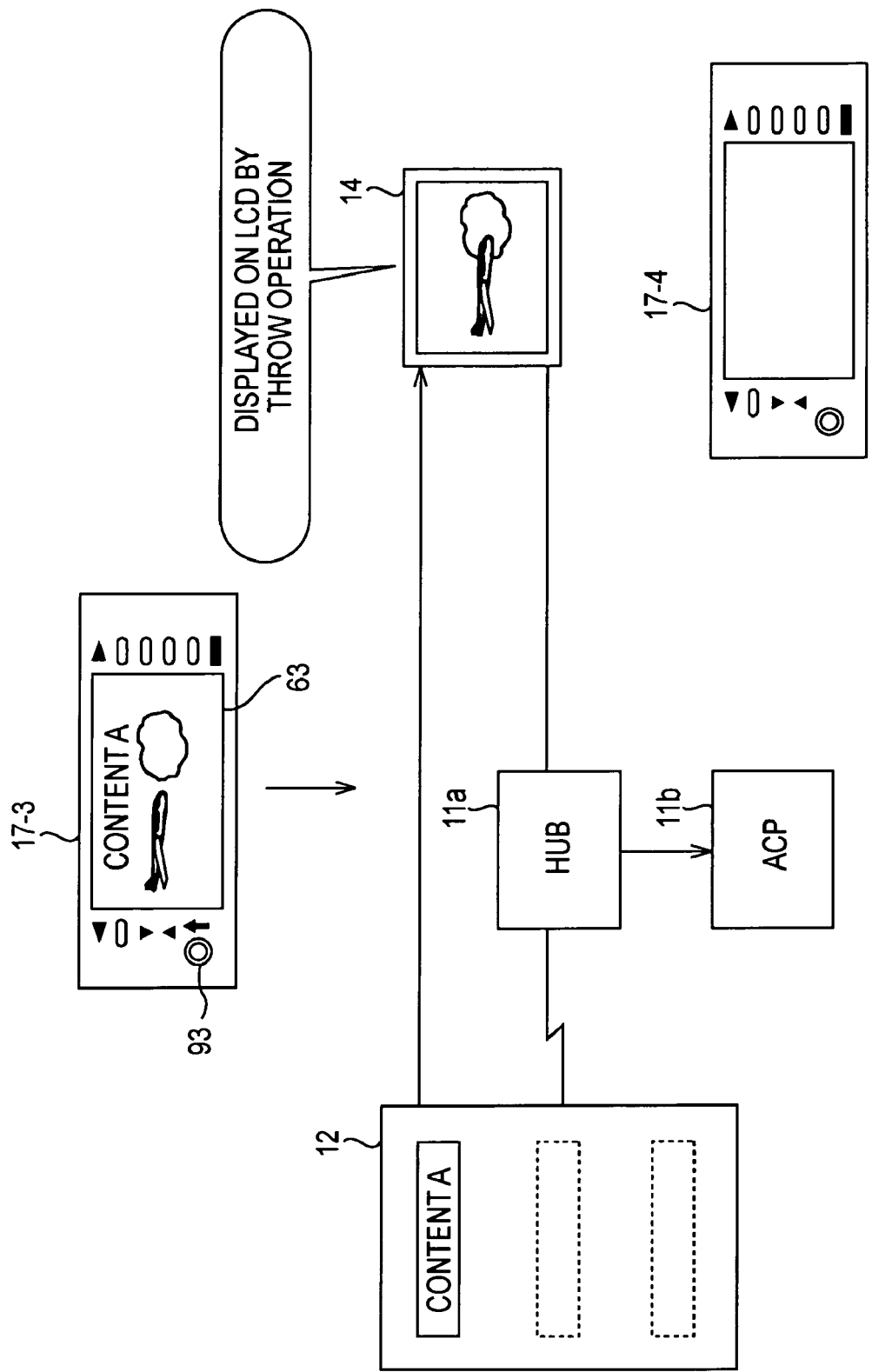
FIG. 10 is an illustration of a throw operation by the operation control apparatus.
Figure 11:
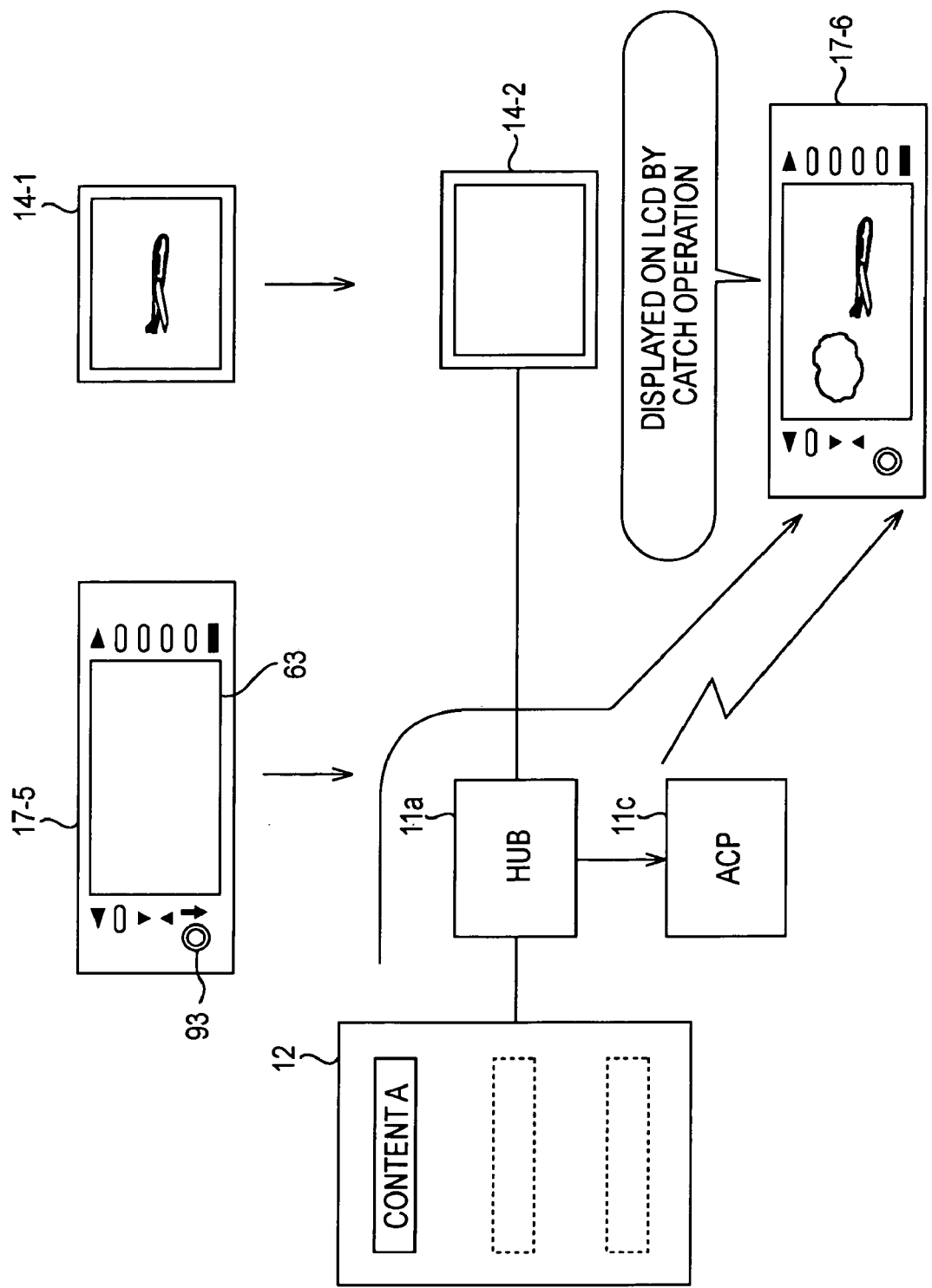
FIG. 11 is an illustration of a catch operation by the operation control apparatus.

Displaying on the operation control apparatus 17, displaying on each display-playback apparatus in response to the throw operation, and displaying on the operation control apparatus 17 in response to the catch operation are shown in FIGS. 9, 10, and 11.

At first, on the LCD 63 on a display panel provided on the operation control apparatus 17 shown in FIG. 9, pieces of content is displayed in list form (17-1) from content information stored in the content providing apparatus 12. By selecting content in such a manner as using cursor moving buttons 90 to position a cursor 91 on a desired content name (hatched portion on the list), and pressing a determination button 92, selected content A is displayed (17-2) on the LCD 63 of the operation control apparatus 17. At this time, if there is history information representing playback in the past of content A to a halfway point, content A can be played back from the halfway point.

Next, as shown in FIG. 10, the case of performing control so that selected content A is played back by the display-playback apparatus 14 is described below. This operation control apparatus 17 is provided with a joystick 93 on the operation panel, and operations on the joystick 93 are assigned to types of content switching. When content selected by the operation control apparatus 17 is displayed by the display-playback apparatus 14 after switching the operation control apparatus 17 to the display-playback apparatus 14, by moving the joystick 93 upwardly (as indicated by the upward black arrow), the throw operation is performed (17-3). The throw operation allows the display-playback apparatus 14 to play back content A by streaming. At this time, content A displayed on the LCD 63 of the operation control apparatus 17 may disappear but does not need to disappear.

Next, as shown in FIG. 11, the case of performing control so that selected content A is played back again by the operation control apparatus 17 is described below. As described above, in the operation control apparatus 17, the operations on the joystick 93 are assigned to the types of content switching. When the display-playback apparatus 14 (14-1) is switched to the operation control apparatus 17 for displaying content A selected by the operation control apparatus 17, by moving the joystick 93 downwardly (indicated by the downward black arrow), the catch operation is performed (17-5). This catch operation switches the display-playback apparatus 14 to the operation control apparatus 17 displaying content A, and content A is played back by streaming by the operation control apparatus 17 (17-6). At this time, content A displayed on the LCD of the display-playback apparatus 14 may disappear but does not need to disappear.

The content display-playback system 10 displays video data stored in each content providing apparatus in response to the throw operation and catch operation using the operation control apparatus 17 while transmitting and receiving the video data among the display-playback apparatuses 14 to 16 or between operation control apparatuses. In addition, in the content display-playback system 10, an operation of reproduction into the storage unit 69 is intuitively performed. In the above-described example, when the operation control apparatus 17 performs a selecting operation while displaying the content list on the LCD 63 serving as a display apparatus, selected content A is displayed on the LCD 63 as the display apparatus of the operation control apparatus 17. However, selected content A may be displayed on one of the LCD 63 of the operation control apparatus 17, and the display-playback apparatuses 14 to 16. In this case, in this embodiment, a previously (last) selected display-playback apparatus is automatically selected by default on the basis of selection-history information of display-playback apparatuses. Also, on the basis of selection-history information of selection in the past, by displaying a list for selection of display-playback apparatuses arranged in order of frequency of being selected, selection by the user is facilitated, and, on the basis of selection-history information, a display-playback apparatus having the highest frequency of being selected is automatically selected by default.

Specific examples of these operations are described with reference to FIGS. 12 and 13. The above-described configuration shown in FIG. 1 can be used as an entire system.

Figure 12:
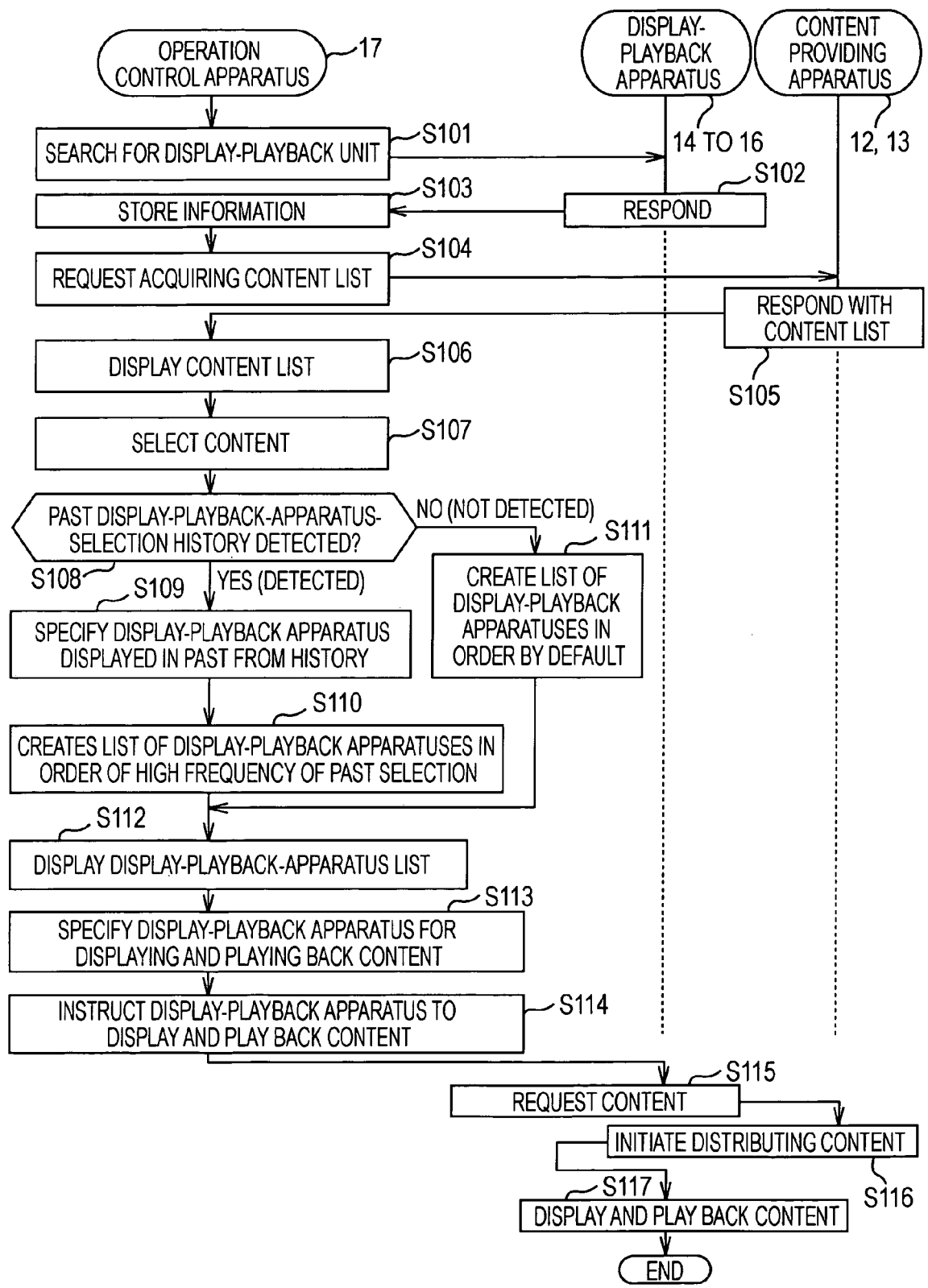
FIG. 12 is a flowchart showing a specific example of a process in which a display-playback apparatus is manually selected.

FIG. 12 shows a specific example of a process in which, when a display-playback apparatus for displaying and playing back selected content is selected, user's selection is facilitated by displaying a display-playback-apparatus list of display-playback apparatuses which are selected on the basis of a history of display-playback-apparatus selection in the past and which are arranged in order of frequency of selection.

In step S101 in FIG. 12, the operation control apparatus 17 shown in FIG. 1 uses the network to search for the display-playback apparatuses 14 to 16. The operation control apparatus 17 receives responses sent by the display-playback apparatuses 14 to 16 in step S102. In step S103, the operation control apparatus 17 stores information of the display-playback apparatuses 14 to 16 based on the responses from the display-playback apparatuses 14 to 16. In step S104, the operation control apparatus 17 sends a query (content list acquiring request) to each of the content providing apparatuses 12 and 13 in FIG. 1 about list information of a list of pieces of content that can be provided by the content providing apparatus. In step S105, each of the content providing apparatuses 12 and 13 responsively sends a content list to the operation control apparatus 17. In step S106, the operation control apparatus 17 displays each content list.

A user selects desired content from the list displayed on the operation control apparatus 17 in step S107, whereby, in step S108, the operation control apparatus 17 determines whether to detect a history of selection of display-playback apparatuses in the past. If the display-playback-apparatus-selection history information is not detected, the operation control apparatus 17 proceeds to step S111, and creates a list of display-playback apparatuses arranged in default order (for example; order of the responses in step S102) before proceeding to step S112.

If, in step S108, it is determined that display-playback-apparatus-selection history information is detected, the operation control apparatus 17 proceeds to step S109, and specifies a display-playback apparatus selected in the past on the basis of the display-playback-apparatus-selection history information. In step S110, the operation control apparatus 17 rearranges the listed display-playback apparatuses in order of frequency of selection to create a display-playback-apparatus list, and, in step S112, the operation control apparatus 17 displays the display-playback-apparatus list. In this case, the displayed display-playback-apparatus list includes not only the display-playback apparatuses 14 to 16 but also the operation control apparatus 17, which has a display-playback function.

In step S113, from the display-playback-apparatus list displayed on the operation control apparatus 17, a display-playback apparatus for displaying and playing back content is selectively designated by the user. When the selectively designated display-playback apparatus is the operation control apparatus 17, the operation control apparatus 17 sends a content distribution request to each of the content providing apparatuses 12 and 13. When the selectively designated display-playback apparatus is one of the display-playback apparatuses 14 to 16 other than the operation control apparatus 17, in step S114, selectively designated one of the display-playback apparatuses 14 to 16, for example, the display-playback apparatus 14, is instructed to display and play back the content. In step S115, the selected display-playback apparatus 14 sends a content distribution request to each of the content providing apparatuses 12 and 13. In step S116, the content is distributed from the content providing apparatuses 12 and 13, and, in step S117, the selected display-playback apparatus 14 displays and plays back the content (streaming playback).

The above description is directed to processing performed when desired content is selected from the content list displayed on the operation control apparatus 17. However, as described above, when the throw operation allows one display-playback apparatus to display and play back content displayed and played back by the operation control apparatus 17, by enabling the user to selectively designate one of the display-playback apparatuses 14 to 16 from a displayed list of the display-playback apparatuses 14 to 16 arranged in order of frequency, the selectively designated display-playback apparatus (for example, the display-playback apparatus 14) may be controlled to display and play back content in response to the throw operation.

Figure 13:
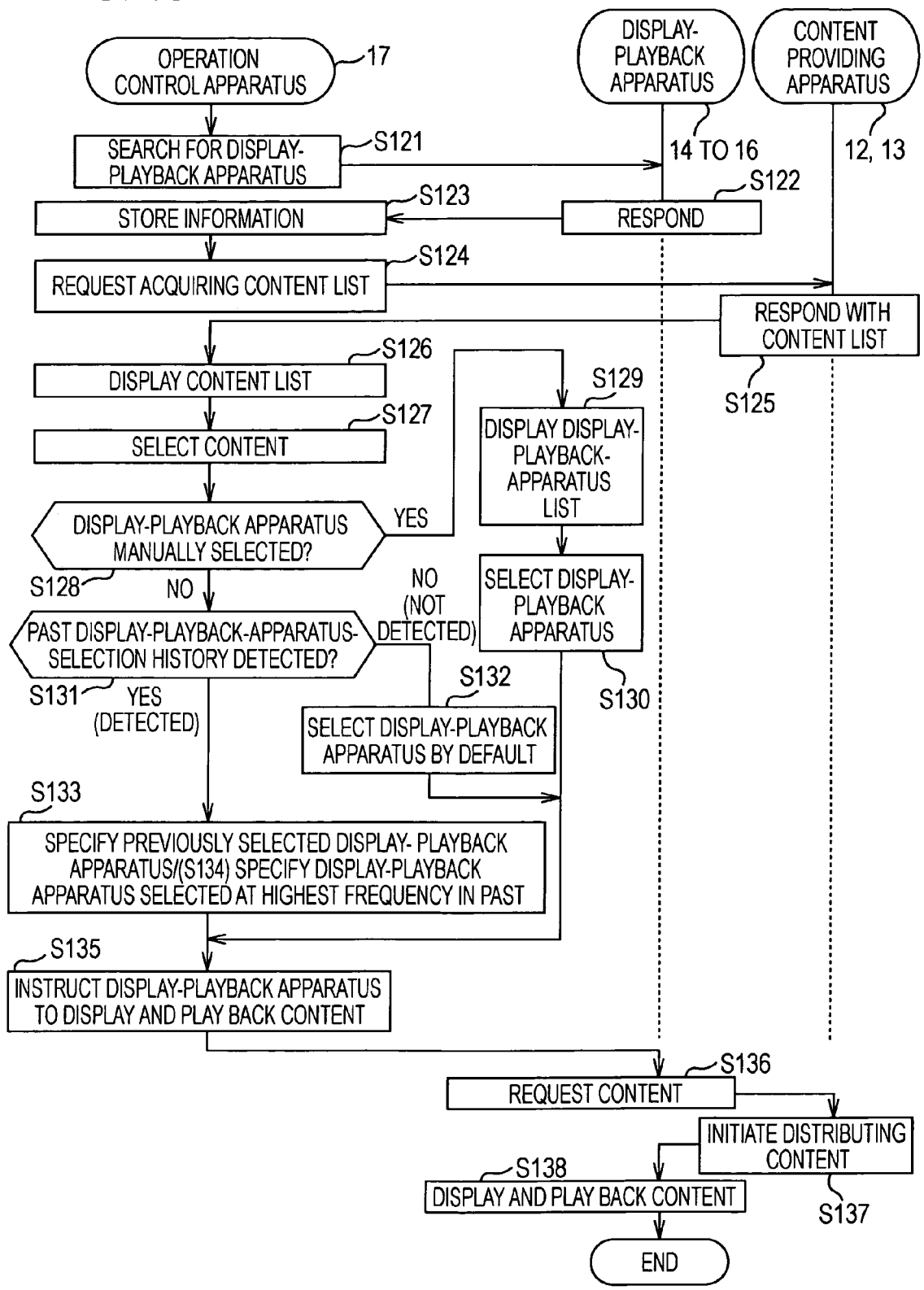
FIG. 13 is a flowchart showing a specific example of a process in which a display-playback apparatus is automatically selected.

Next, FIG. 13 shows a specific example of a process in which, in the case of selecting a display-playback apparatus for displaying and playing back selected content, when the user does not select any display-playback apparatus, an appropriate display-playback apparatus is automatically selected on the basis of a history of selection of display-playback apparatuses in the past.

In FIG. 13, in step S121, the operation control apparatus 17 in FIG. 1 searches the display-playback apparatuses 14 to 16. In step S122, the operation control apparatus 17 receives responses from the display-playback apparatuses 14 to 16. In step S123, the operation control apparatus 17 stores information of the display-playback apparatuses 14 to 16 based on the responses. In step S124, the operation control apparatus 17 sends a query (content list acquiring request) to the content providing apparatuses 12 and 13 in FIG. 1 about list information of a list of pieces of content that can be provided by each content providing apparatus. In step S125, each of the content providing apparatuses 12 and 13 sends a content list as a response to the operation control apparatus 17. In step S126, the operation control apparatus 17 displays the content list.

In step S127, by selecting, by the user, desired content from the list displayed on the operation control apparatus 17, in step S128, the operation control apparatus 17 determines whether a display-playback apparatus is to be manually selected by the user. Immediately after selecting the desired content in step S127, a screen for querying about whether the display-playback apparatus is to be manually selected may be displayed. However, it is preferable that the manual selection be set beforehand on a setting screen such as an initial setting mode screen. If, in step S128, the operation control apparatus 17 has determined that a display-playback apparatus is to be manually selected by the user, the operation control apparatus 17 proceeds to step S129 and displays a display-playback-apparatus list. After a display-playback apparatus is selected in step S130, the operation control apparatus 17 proceeds to step S135. Regarding displaying of the display-playback-apparatus list, as described with reference to FIG. 12, obviously, display-playback apparatuses may be displayed in order of frequency of selection in the past on the basis of the display-playback-apparatus-selection history information.

If, in step S128, the operation control apparatus 17 has determined that a display-playback apparatus is to be manually selected by the user, the operation control apparatus 17 proceeds to step S131 and determines whether the display-playback-apparatus-selection history information is detected. If the display-playback-apparatus-selection history information is not detected, the operation control apparatus 17 proceeds to step S132 and selects a default display-playback apparatus (for example, a display-playback apparatus that initially responds to the operation control apparatus 17 in step S122) before proceeding to step S135.

If, in step S131, the operation control apparatus 17 has determined that the display-playback-apparatus-selection history information is detected, the operation control apparatus 17 proceeds to step S133. In step S133, the operation control apparatus 17 specifies, from among display-playback apparatuses selected in the past, a last selected display-playback apparatus, that is, a previously selected display-playback apparatus before proceeding to step S135. Instead of step S133, step S134 may be performed. In step S134, the operation control apparatus 17 specifies a (most frequently selected) display-playback apparatus having the highest frequency of selection from among the display-playback apparatuses selected in the past, and proceeds to step S135.

In this case, the display-playback apparatuses to be selected include, not only the display-playback apparatuses 14 to 16 in FIG. 1, but also the operation control apparatus 17 having the display-playback function. When the specified display-playback apparatus is the operation control apparatus 17, the operation control apparatus 17 sends a content distribution request to each of the content providing apparatuses 12 and 13. When the specified display-playback apparatus is one of the display-playback apparatuses 14 to 16 other than the operation control apparatus 17, in step S135, selectively designated one of the display-playback apparatuses 14 to 16, for example, the display-playback apparatus 14, is instructed to display and play back the content.

In step S136, the selectively designated one of the display-playback apparatuses 14 to 16, for example, the display-playback apparatus 14, which is instructed to display and play back the content, sends a content distribution request to each of the content providing apparatuses 12 and 13. In step S137, the content providing apparatuses 12 and 13 initiate distributing the content. In step S138, the content providing apparatuses 12 and 13 display and play back (by streaming) the content on the selected display-playback apparatus 14.

An example of processing performed when desired content is selected from the content list displayed on the operation control apparatus 17 has been described. However, as described above, this example of processing is applicable to a case in which content being displayed and played back by the operation control apparatus 17 is displayed and played back by another display-playback apparatus in response to the throw operation. For example, on the basis of display-playback-apparatus-selection history information of the display-playback apparatuses 14 to 16, from the display-playback apparatuses 14 to 16, a last selected display-playback apparatus may automatically be selected. Alternatively, by automatically selecting a most frequently selected display-playback apparatus, display and playback of content in response to the throw operation may be performed.

Figure 14:
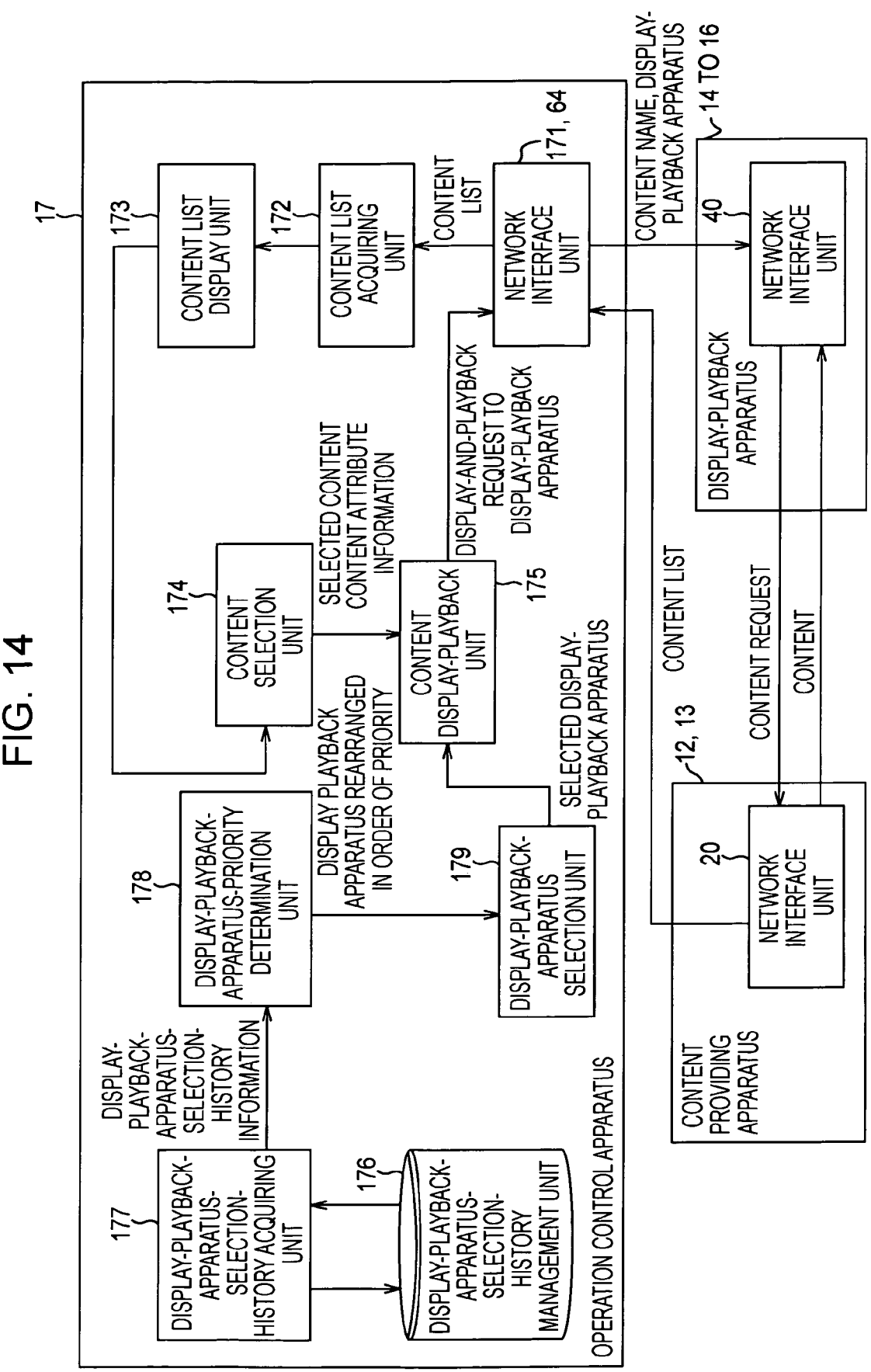
FIG. 14 is a functional block diagram showing an example of a functional configuration for realizing selection of a content display-playback apparatus.

Next, FIG. 14 is a functional block diagram for realizing manual or automatic selection of the above-described display-playback apparatus. In FIG. 14, each of the content providing apparatuses 12 and 13 may have a configuration similar to that shown in FIG. 2, and each of the display-playback apparatuses 14 to 16 may have a configuration similar to that shown in FIG. 4. The operation control apparatus 17 may have a configuration similar to that shown in FIG. 6. The configuration is indicated by functional blocks adapted only for realizing the selection of the above display-playback apparatus.

In FIG. 14, each of the content providing apparatuses 12 and 13, each of the display-playback apparatuses 14 to 16, and the operation control apparatus 17 are connected to the network through network interfaces 20, 40, and 171. The network interface 171 of the operation control apparatus 17 corresponds to the network interface 64 shown in FIG. 6. The network interface 171 receives the content list from each of the content providing apparatuses 12 and 13 through the network interface 20, and sends a content name and a display-playback apparatus name to the display-playback apparatuses 14 to 16 through the network interface 40.

In the operation control apparatus 17, the content list received through the network interface 171 is acquired by a content list acquiring unit 172 and is displayed by the content list display unit 173. A content selection unit 174 performs the above desired content selection and sends selected content and content attribute information to a content display-playback unit 175. A display-playback-apparatus-selection-history management unit 176 stores the above-described display-playback-apparatus-selection history information. After the display-playback-apparatus-selection history information is acquired by a display-playback-apparatus-selection-history acquiring unit 177, a display-playback-unit-priority determination unit 178 rearranges display-playback apparatuses in order of frequency (priority), as described above, and sends a list of the display-playback apparatuses rearranged in order of priority to a display-playback-apparatus selection unit 179. As described above, in the display-playback-apparatus selection unit 179, a display-playback apparatus is automatically or manually selected and information of the selected display-playback apparatus is sent to the content display-playback unit 175. A display-and-playback request to the display-playback apparatus is output from the content display-playback unit 175 and is sent to each of the display-playback apparatuses 14 to 16 through the network interface unit 171. A content request is sent from the network interface 40 of each of the display-playback apparatuses 14 to 16 and to the network interface 20 of each of the content providing apparatuses 12 and 13. Requested content is transmitted from the network interface 20 of each of the content providing apparatuses 12 and 13 to the network interface 40 of one of the display-playback apparatuses 14 to 16.

Next, a case in which a plurality of users (operation control apparatuses) select the same display-playback apparatus is described as another embodiment of the present invention.

It is assumed that, when a television receiver serving as a display-playback apparatus and two operation control apparatuses (for example, infrared remote commanders) that can control the television receiver are used, a first user uses a first infrared remote commander to view broadcast program A. In this state, when a second user uses a second infrared remote commander to select different broadcast program B, the television receiver switches internal settings so as to receive broadcast program B since control by the second user is enabled (last operation is preferentially performed) when the television receiver is of a common type. Even in such control that preferentially performs last operation, it can be assumed that the second user is positioned within a range of vision of the first user in order for the infrared remote commanders as control apparatuses to have predetermined directivity and a control-signal reaching range. Accordingly, it seems that the control that preferentially performs last operation does not cause any considerable inconvenience since mediation (adjustment) is implemented between the users, that is, adjustment is implemented in use of the remote commanders.

However, when a control signal is transmitted from one control apparatus (operation control apparatus) by using a communication medium, such as a network, having no directivity and capable of control from a remote place, as in the above-described content display-playback system, if the above control that preferentially performs last operation is performed in a situation in which the mediation between users is difficult, a broadcast program being viewed is switched without any notice.

In view of this point, in an embodiment of the present invention, in cases such as when a nondirectional medium, such as a network, is used as a communication medium for a control signal of an audio-visual device or the like, in a circumstance in which the existence of a second user who attempts to perform control a controlled apparatus (content display-playback apparatus) by using a remote controller (operation control apparatus) can hardly be perceived by the first user who is using the controlled apparatus, the use of the controlled apparatus is allowed or rejected for the second user. For example, there are the following configurations:

(1) Remote controller (operation control apparatus) providing a function in which, before a desired control signal is transmitted from a remote controller used by a second user, in a case in which, by confirming an operating state of a controlled apparatus (content display-playback apparatus), information that represents an operating state indicating that the controlled apparatus is being used by a first user is acquired, the function informs the second user of the situation and guides the second user to direct the subsequent operations;

(2) Controlled apparatus (content display-playback apparatus) in which information capable of specifying a controller (operation control apparatus) which requests control originating the present operating state can be stored in at least a time in which the operation continues;

(3) Controlled apparatus (content display-playback apparatus) in which information capable of specifying a controller (operation control apparatus) which requests control originating the present operating state can be transmitted in response to an external request in at least a time in which the operation continues;

(4) Remote controller (operation control apparatus) in which, when the information in the above (3) transmitted from the controlled apparatus (content display-playback apparatus) coincides with that of the remote controller, the guiding function in the above (1) can be omitted;

(5) Controlled apparatus (content display-playback apparatus) in which, when a new control request from the remote controller (operation control apparatus) coincides with that from the remote controller which request content originating the present operating state, the controlled apparatus receives the new control request; and (6) Controlled apparatus (content display-playback apparatus) that can be set so as to exclude requests other than a request from a particular controller (operation control apparatus).

In the embodiment of the present invention, in order to eliminate the above inconvenience, an idea that, when an apparatus is used by a user, control authority is given as a vested right to the user, differently from simple control that preferentially performs last control.

Figure 15:
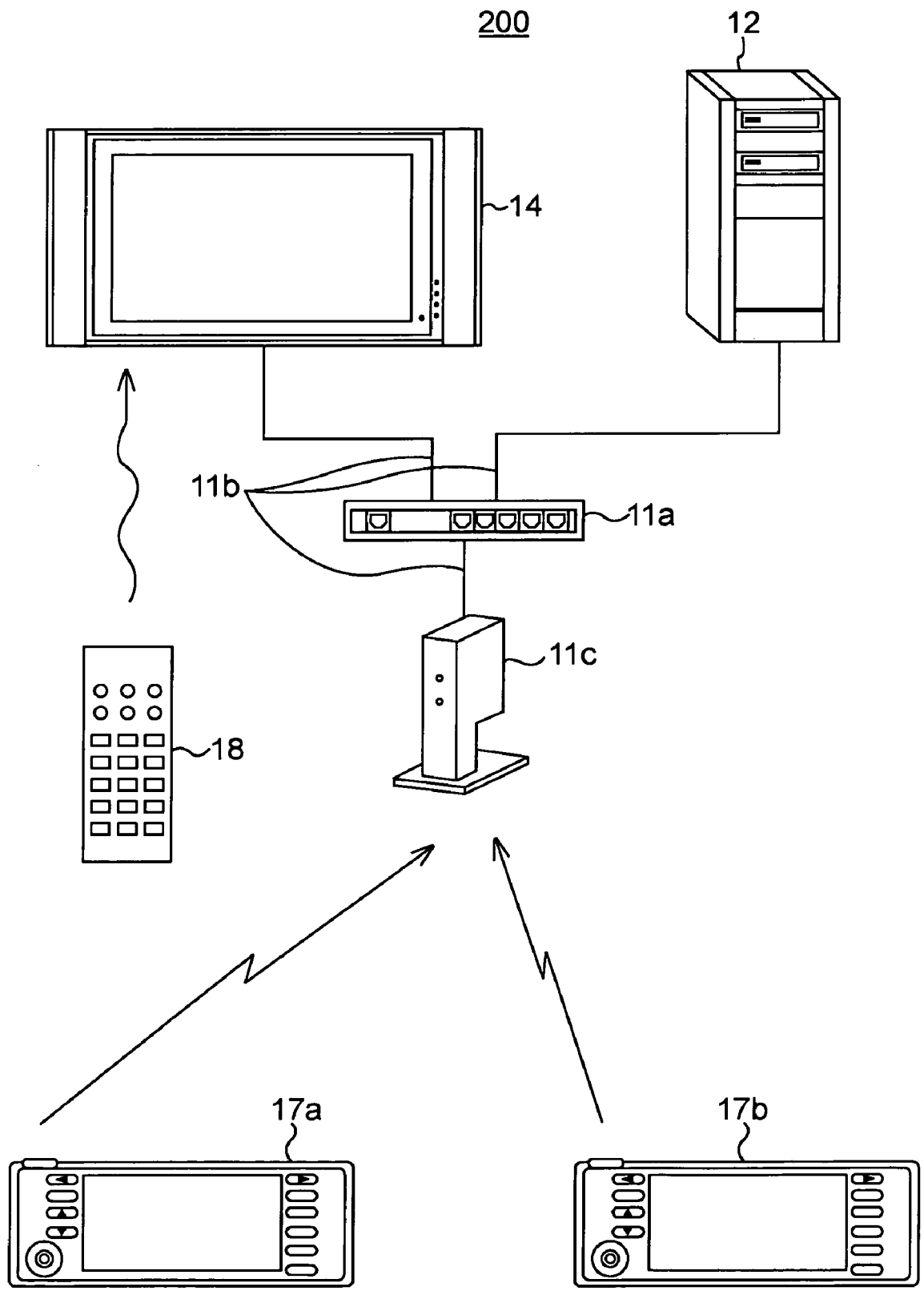
FIG. 15 is an illustration of an example of the configuration of a display-playback system according to another embodiment of the present invention.

FIG. 15 shows an example of the configuration of a content display-playback system 200 for use in an embodiment of the present invention.

In FIG. 15, in the content display-playback system 200, a content providing apparatus 12, whose specific example is an AV content server such as a DVR, and a display-playback apparatus 14 which has a display element such as a CRT, LCD, or PDP for displaying video and which plays back audio associated with the video are connected to a home network 11 formed by combining a wireless network and a wired network. In addition, operation control apparatuses 17a and 17b that control the content providing apparatus 12 and the display-playback apparatus 14 are linked to the home network 11. The number of operation control apparatuses such as the operation control apparatuses 17a and 17b may be three or more. An operation control apparatus 18 (such as a so-called "infrared remote controller") for controlling operations on the display-playback apparatus 14 may be used. As shown in FIG. 1, the content display-playback system 200 may have a configuration in which a plurality of content display-playback apparatuses, for example, two content providing apparatuses 12 and 13, and three display-playback apparatuses 14 to 16 are connected to one another.

The home network 11 is an in-home digital network, and, by using a network cable 11b complying with, for example, CAT5 (Category 5) as the TIA/EIA-568-A standard, connects the content providing apparatus 12 and the display-playback apparatus 14 through a hub 11a. Also, in the home network 11, an access point 11c for a wireless LAN is connected to the hub 11a, and the operation control apparatuses 17a and 17b are wirelessly linked to the access point 11c in accordance with a predetermined protocol such as the IEEE 802.11 protocol or an extended protocol thereof. Accordingly, the operation control apparatuses 17a and 17b are linked to the content providing apparatus 12 and display-playback apparatus 14 on the home network 11. The operation control apparatuses 17a and 17b can control operations on the content providing apparatus 12 and the display-playback apparatus 14.

For example, the content providing apparatus 12, which is a server or the like, has a built-in storage device such as an HDD for storing video content, and can distribute the content by using the home network 11. The display-playback apparatus 14, which is a television receiver or the like, is a video playback apparatus that plays back video content distributed through the home network 11 and outputs the played-back content on a display screen. These apparatuses are controlled by the operation control apparatuses 17a and 17b to operate. At least the operation control apparatus 17b has a display device and can display additional information (metainformation) of content. The operation control apparatus 17a and the operation control apparatus 18 may have display devices.

The configuration described with reference to the FIGS. 2 and 3 may be used as a specific configuration of the content providing apparatus 12. The configuration described with FIGS. 4 and 5 may be used as a specific configuration of the display-playback apparatus 14. The configuration described with reference to FIGS. 6 and 7 may be used as a specific configuration of each of the operation control apparatuses 17a and 17b. When presently performing display and playback, the display-playback apparatus 14 stores information identifying a user who request the operation (playback). The information identifying the user is information representing a source of a control signal. Specifically, for processing initiated by a control signal from each of the operation control apparatus 17a and 17b, the information identifying the user is an ID number of each of the operation control apparatus 17a and 17b. For processing initiated by a control signal from the operation control apparatus 18 such as an infrared remote controller for directly controlling operations on the display-playback apparatus 14, the information identifying the user is an ID number of the operation control apparatus 18. In addition, for an operation on an operation panel of the display-playback apparatus 14, an ID number of the display-playback apparatus 14 may be used. The information representing the source of the control signal is temporarily stored in, for example, the RAM 49 or the like in the display-playback apparatus 14, and is read in response to a playback request from another operation control apparatus, as described later.

Figure 16B:
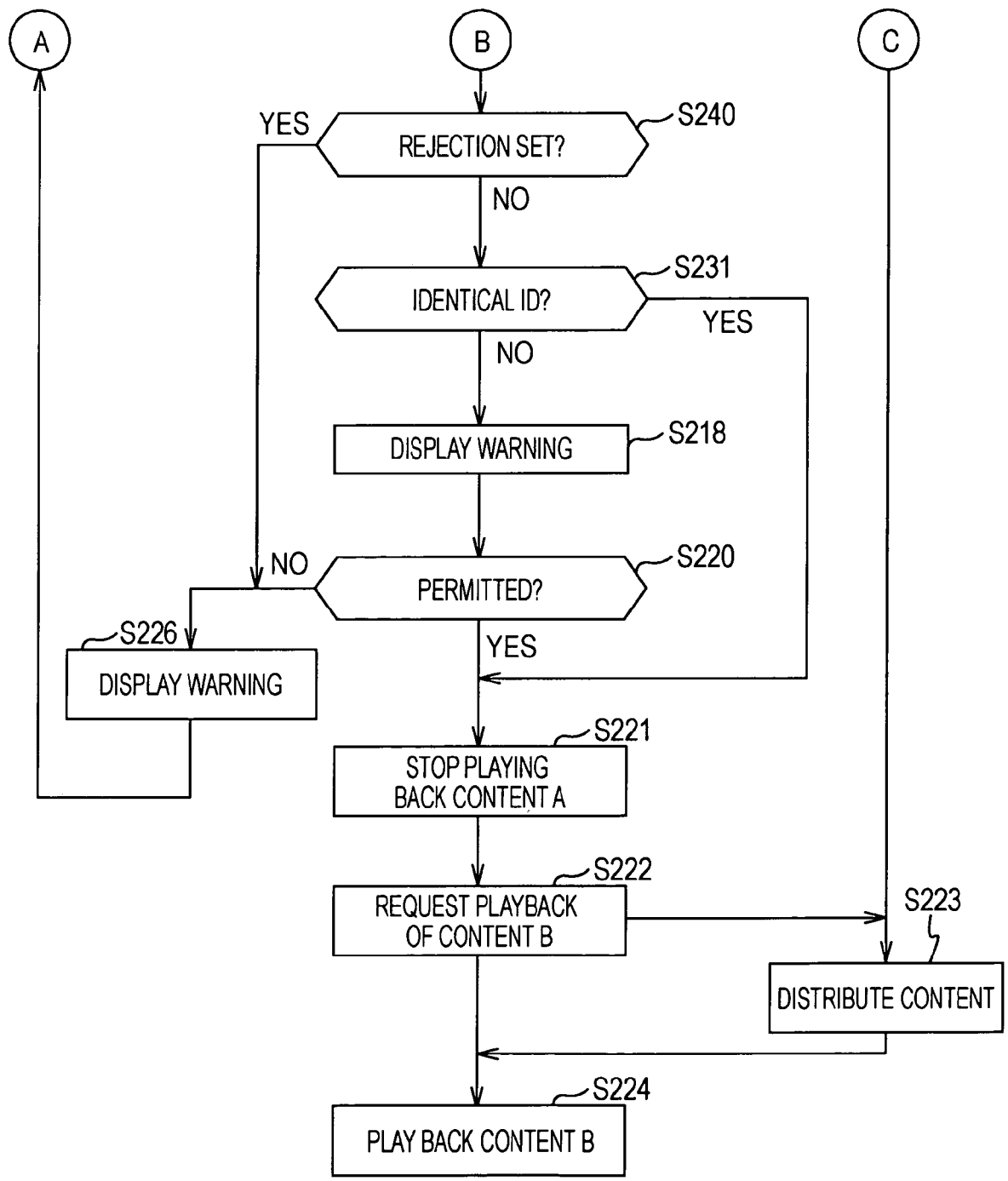
FIG. 16B is a flowchart showing the latter half of the specific example process of selection of the display-playback apparatus by the operation control apparatus.

Next, FIGS. 16A and 16B are flowcharts illustrating processing in an embodiment of the present invention.

At first, in response to an operation on the operation control apparatus 17a or the operation control apparatus 18 by a first user, by using the system shown in FIG. 15, the display-playback apparatus 14 receives (video) content A distributed (step S204) by streaming from the content providing apparatus 12. In step S205, the display-playback apparatus 14 plays back content A.

A case in which, in this operating state or in a status of use of the display-playback apparatus 14, a second user uses the operation control apparatus 17b to view video content B different from content A on the display-playback apparatus 14 is described below. In step S206, the operation control apparatus 17b requests content list information of the content providing apparatus 12 therefrom in order for the second user to select content B. In step S207, the content providing apparatus 12 responsively transmits the content list to the operation control apparatus 17b. In step S208, the content list is displayed on a display device of the operation control apparatus 17b. In step S209, from the content list, content B is selected by the second user to perform an operation of requesting playback of content B. When detecting this operation, the operation control apparatus 17b requests the display-playback apparatus 14 to report an operating state (status) in step S210. In step S211, the display-playback apparatus 14 reports, to the operation control apparatus 17b, information identifying a user who requests control originating the operating state (during playback), or a user who requests the operation or information based on the user, with operating state information. The information based on the user or the information identifying the user may be information representing a source of a control signal. For example, for processing initiated by a control signal from a different apparatus such as the operation control apparatus 17a or the operation control apparatus 18, an ID number of the operation control apparatus 17a or the operation control apparatus 18 is transmitted to the operation control apparatus 17b. For an operation on an operation panel of the display-playback apparatus 14, an ID number of the display-playback apparatus 14 is transmitted to the operation control apparatus 17b. After the operation control apparatus 17b receives this information in step S212, the operation control apparatus 17b confirms whether the display-playback apparatus 14 is in operating (playback) by a different user. In the example shown in FIGS. 16A and 16B, in step S230, the operation control apparatus 17b determines whether ID (such as the operation-control-apparatus ID number) that identifies the user who performs the present playback operation on the display-playback apparatus 14 is identical to that of the first user. If the ID is identical (indicated by Yes), the operation control apparatus 17b proceeds to step S216. If the ID is not identical (indicated by No), the operation control apparatus 17b displays a warning in step S213, and requests the second user to perform the following operation. An example of the displayed warning is shown in FIG. 17A. When the second user strongly wishes to play back content B, for example, by selecting "YES" in FIG. 17A, the result of determination in step S215 is made affirmative (indicated by Yes), and, in step S216, the operation control apparatus 17b transmits a content-B playback request to the display-playback apparatus 14. Alternatively, for example, by selecting "NO" in FIG. 17A, the result of determination in step S215 is made negative (indicated by No), and the operation control apparatus 17b returns to, for example, step S208. After, in step S217, the display-playback apparatus 14 receives content-B playback request, in step S240, the display-playback apparatus 14 determines whether it is set for rejection (described later). If the display-playback apparatus 14 is set for rejection (Yes in step S240), the display-playback apparatus 14 proceeds to step S226, while, if the display-playback apparatus 14 is not set for rejection (No in step S240), the display-playback apparatus 14 proceeds to step S231. In step S231, similarly to step S230, it is determined whether ID (such as the operation-control-apparatus ID number) that identifies the user who performs the present playback operation on the display-playback apparatus 14 is identical. If the ID is identical ("YES" in step S231), the display-playback apparatus 14 proceeds to step S221, while, if the ID is not identical ("NO" in step S231), in step S218, the display-playback apparatus 14 displays a warning and instructs the first user to determine for the warning. An example of the displayed warning is shown in FIG. 17B. When the first user stops playback of the present content A and transfers (permits) its use to the second user, for example, by selecting "YES" in FIG. 17B, the result of determination in step S220 is made affirmative (indicated by Yes), and, in step S221, the display-playback apparatus 14 stops playing back content A, and, in step S222, the display-playback apparatus 14 transmits a request of playback of content B to the content providing apparatus 12. After, in step S223, the content providing apparatus 12 receives this request, the content providing apparatus 12 distributes content B to the display-playback apparatus 14, and, in step S224, the display-playback apparatus 14 plays back content B.

If the first user wishes to continuously hear playback of content A, the first user can reject the playback request. In this case, for example, by selecting "NO" in FIG. 17B, the result of determination in step S220 is made negative (indicated by No), and the operation control apparatus 17b is notified of the rejection of the playback request. After being notified as described above, in step S226, the operation control apparatus 17b displays a warning as shown in FIG. 17C, and changes to, for example, displaying the content list in step S208.

As described above, if the first user has realized playing back content A by performing an operation on the operation control apparatus 17b, at the time of step S212, the playback request is identified as having been sent from the same operation device. Thus, the playback request is regarded as a new request from the same user (step S230). Accordingly, the need to perform processing such as displaying a warning (step S213) is eliminated, and playback may be requested (step S216). Similarly, the display-playback apparatus 14 also stores ID of an operation device originating the present operating state, whereby, in the case (S231) of control following the requesting playback (step S216), step S221 and the subsequent steps are performed in order to immediately switch playing back content without displaying a warning (step S218). The content display-playback system 200 may have a configuration in which, by omitting step S230 or S231, the process can proceed from step S212 or S217 to step S213 or S218 at all times.

In step, setting of the display-playback apparatus 14 by the first user so as to reject control by another, as shown in step S240, may be employed, if necessary. Step S240 may be omitted.

As described above, by using an operating state of a display-playback apparatus and information (user identifying information) based on a user who is using the display-playback apparatus, a mechanism in which the use of a display-playback apparatus being already used by a previous user can be permitted and rejected for a different user can be provided. In addition, a display-playback apparatus can be set so as to be only controlled by a particular remote controller (operation control apparatus). Furthermore, when the display-playback apparatus is controlled by the same remote controller (operation control apparatus), the display-playback apparatus can allow being controlled without performing confirmation for permission and rejection.

The present invention is not limited only to the above-described embodiments, but may be variously modified without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A content display-playback system comprising:
    a content providing apparatus;
    a content display-playback apparatus; and
    a portable operation control apparatus for controlling the content providing apparatus and the content display-playback apparatus by wirelessly communicating with the content providing apparatus and the content display-playback apparatus, wherein on the basis of operation control by the operation control apparatus, content is transmitted from the content providing apparatus to the content display-playback apparatus for display and playback through a network, the operation control apparatus includes, in a same housing:

an input operation reception unit configured to receive an operation input from a user, a control signal generation unit configured to generate a control signal for transmitting and receiving the content among the content providing apparatus, the content display-playback apparatus, and the operation control apparatus in response to the operation input received by the input operation receiving unit, and a storage unit which stores selection-history information of content display-playback apparatuses, the selection-history information including a list of the content display-playback apparatuses, which include the content display-playback apparatus and at least one other content display-playback apparatus, arranged in an order of frequency of being historically selected to display and play back content transmitted from the content providing apparatus by the control signal generating unit, and when the input operation reception unit receives an operation input for transmitting the content from the content providing apparatus to the content display-playback apparatus for display and playback, the control signal generating unit generates a control signal for selecting a predetermined content display-playback apparatus on the basis of the selection-history information stored in the storage unit and transmitting the content from the content providing apparatus to the selected content display-playback apparatus for display and playback, such that a display-playback apparatus having a highest frequency of being selected is automatically selected by default for display and playback, wherein one of content-display-playback-and-operation-control apparatuses, each having a content display-playback function, is used as the operation control apparatus, the control signal generating unit selects a predetermined content-display-playback-and-operation-control apparatus or content display-playback apparatus on the basis of selection-history information of the content-display-playback-and-operation-control apparatuses and the content display-playback apparatuses, and when the operation control apparatus performs a playback-control operation for requesting one content display-playback apparatus to perform playback, depending on at least a present operating state of the one content display-playback apparatus, the one content display-playback apparatus determines whether to be controlled by the playback-control operation, the present operating state indicating a status of displaying and playing back of content by the one content display-playback apparatus by a user.

2. The content display-playback system according to claim 1, wherein, when the operation control apparatus performs the playback-control operation for requesting the content display-playback apparatus to perform playback, the content display-playback apparatus transmits the present operating state to the operation control apparatus and allows the operation control apparatus to display a warning.

3. The content display-playback system according to claim 1, wherein the content display-playback apparatus stores identification information for specifying an operation control apparatus requesting control which originates the present operating state.

4. The content display-playback system according to claim 3, wherein, when one operation control apparatus among the operation control apparatuses performs a playback control operation on the content display-playback apparatus, the content display-playback apparatus transmits, to said one operation control apparatus, the identification information for specifying the operation control apparatus requesting control which originates the present operating state.

5. The content display-playback system according to claim 1, wherein the content display-playback apparatus rejects playback-control requests from operation control apparatuses other than an operation control apparatus requesting control which originates a present operating state of the content display-playback apparatus, the present operating state indicating a status of displaying and playing back of content by the content display-playback apparatus by a user.

6. A content display-playback system comprising:
a content providing apparatus;
a plurality of content display-playback apparatuses; and
a portable operation control apparatus for controlling the content providing apparatus and the content display-playback apparatuses by wirelessly communicating with the content providing apparatus and the content display-playback apparatuses, wherein on the basis of operation control by the operation control apparatus, content is transmitted from the content providing apparatus to each content display-playback apparatus for display and playback through a network, the operation control apparatus includes, in a same housing:

an input operation reception unit configured to receive an operation input from a user, a control signal generation unit configured to generate a control signal for transmitting and receiving the content among the content providing apparatus, the content display-playback apparatuses, and the operation control apparatus in response to the operation input received by the input operation reception unit, a storage unit which stores selection-history information of content display-playback apparatuses, the selection-history information including a list of the content display-playback apparatuses, which include the content display-playback apparatus and at least one other content display-playback apparatus, arranged in an order of frequency of being historically selected to display and play back content transmitted from the content providing apparatus by the control signal generating unit, and a display unit, and when the input operation reception unit receives an operation input for transmitting the content from the content providing apparatus to one content display-playback apparatus for display and playback, on the basis of the selection-history information stored in the storage unit, the display unit displays the list of content display-playback apparatuses arranged in the order of frequency of being historically selected, and a display-playback apparatus having a highest frequency of being selected is automatically selected by default for display and playback, wherein one of content-display-playback-and-operation-control apparatuses, each having a content display-playback function, is used as the operation control apparatus, the control signal generating unit selects a predetermined content-display-playback-and-operation-control apparatus or content display-playback apparatus on the basis of selection-history information of the content-display-playback-and-operation-control apparatuses and the content display-playback apparatuses, and when the operation control apparatus performs a playback-control operation for requesting one content display-playback apparatus to perform playback, depending on at least a present operating state of the one content display-playback apparatus, the one content display-playback apparatus determines whether to be controlled by the playback-control operation, the present operating state indicating a status of displaying and playing back of content by the one content display-playback apparatus by a user.

7. A content display-playback method for a system which includes a content providing apparatus, at least one content display-playback apparatus, and a portable operation control apparatus for controlling the content providing apparatus and the content display-playback apparatus by wirelessly communicating with the content providing apparatus and the content display-playback apparatus, and in which, on the basis of operation control by the operation control apparatus, content is transmitted from the content providing apparatus to the content display-playback apparatus for display and playback through a network, the operation control by the operation control apparatus comprising the steps of:

receiving an operation input from a user;

generating, in the operation control apparatus, a control signal for transmitting and receiving the content among the content providing apparatus, the content display-playback apparatus, and the operation control apparatus in response to the operation input received in the input operation receiving step; and storing, in a storage unit of the operation control apparatus, selection-history information of content display-playback apparatuses, the selection-history information including a list of the content display-playback apparatuses, which include the content display-playback apparatus and at least one other content display-playback apparatus, arranged in an order of frequency of being historically selected to display and play back content transmitted from the content providing apparatus in the control signal generating step, wherein, when an operation input for transmitting the content from the content providing apparatus to the content display-playback apparatus for display and playback is received in the input operation receiving step, in the control signal generating step, a control signal for selecting a predetermined content display-playback apparatus on the basis of the selection-history information stored in the storage unit of the operation control apparatus and transmitting the content from the content providing apparatus to the selected content display-playback apparatus for display and playback is generated, such that a display-playback apparatus having a highest frequency of being selected is automatically selected by default for display and playback, wherein one of content-display-playback-and-operation-control apparatuses, each having a content display-playback function, is used as the operation control apparatus in the control signal generating step, a predetermined content-display-playback-and-operation-control apparatus or content display-playback apparatus is selected on the basis of selection-history information of the content-display-playback-and-operation-control apparatuses and the content display-playback apparatuses, and when the operation control apparatus performs a playback-control operation for requesting one content display-playback apparatus to perform playback, depending on at least a present operating state of the one content display-playback apparatus, the one content display-playback apparatus determines whether to be controlled by the playback-control operation, the present operating state indicating a status of displaying and playing back of content by the one content display-playback apparatus by a user.

8. The content display-playback method according to claim 7, wherein, when the operation control apparatus performs the playback-control operation for requesting the one content display-playback apparatus to perform playback, the one content display-playback apparatus transmits the present operating state to the operation control apparatus and allows the operation control apparatus to display a warning.

9. A content display-playback method for a system which includes a content providing apparatus, a plurality of content display-playback apparatuses, and a portable operation control apparatus for controlling the content providing apparatus and the content display-playback apparatuses by wirelessly communicating with the content providing apparatus and the content display-playback apparatuses, and in which, on the basis of operation control by the operation control apparatus, content is transmitted from the content providing apparatus to each content display-playback apparatus for display and playback through a network, the operation control by the operation control apparatus comprising the steps of:

receiving an operation input from a user;

generating, in the operation control apparatus, a control signal for transmitting and receiving the content among the content providing apparatus, the content display-playback apparatuses, and the operation control apparatus in response to the operation input received in the input operation receiving step;

storing, in the operation control apparatus, selection-history information of content display-playback apparatuses, the selection-history information including a list of the content display-playback apparatuses, which include the content display-playback apparatus and at least one other content display-playback apparatus, arranged in an order of frequency of being historically selected to display and play back content transmitted from the content providing apparatus in the control signal generating step; and performing displaying on a display unit of the operation control apparatus, wherein, when an operation input for transmitting the content from the content providing apparatus to one content display-playback apparatus for display and playback is received in the input operation receiving step, in the displaying step, the list of content display-playback apparatuses arranged in the order of frequency of being historically selected is displayed on the basis of the selection-history information stored in the storing step, and a display-playback apparatus having a highest frequency of being selected is automatically selected by default for display and playback, wherein one of content-display-playback-and-operation-control apparatuses, each having a content display-playback function, is used as the operation control apparatus, in the control signal generating step, a predetermined content-display-playback-and-operation-control apparatus or content display-playback apparatus is selected on the basis of selection-history information of the content-display-playback-and-operation-control apparatuses and the content display-playback apparatuses, and when the operation control apparatus performs a playback-control operation for requesting one content display-playback apparatus to perform playback, depending on at least a present operating state of the one content display-playback apparatus, the one content display-playback apparatus determines whether to be controlled by the playback-control operation, the present operating state indicating a status of displaying and playing back of content by the one content display-playback apparatus by a user.

10. A non-transitory recording medium having a content display-playback program recorded thereon for displaying and playing back content in a system which includes a content providing apparatus, at least one content display-playback apparatus, and a portable operation control apparatus for controlling the content providing apparatus and the content display-playback apparatus by wirelessly communicating with the content providing apparatus and the content display-playback apparatus, and in which, on the basis of operation control by the operation control apparatus, content is transmitted from the content providing apparatus to the content display-playback apparatus for display and playback through a network, the operation control by the operation control apparatus comprising the steps of:

receiving an operation input from a user;

generating, in the operation control apparatus, a control signal for transmitting and receiving the content among the content providing apparatus, the content display-playback apparatus, and the operation control apparatus in response to the operation input received in the input operation receiving step; and storing, in the operation control apparatus, selection-history information of content display-playback apparatuses, the selection-history information including a list of the content display-playback apparatuses, which include the content display-playback apparatus and at least one other content display-playback apparatus, arranged in an order of frequency of being historically selected to display and play back content transmitted from the content providing apparatus in the control signal generating step, wherein, when an operation input for transmitting the content from the content providing apparatus to the content display-playback apparatus for display and playback is received in the input operation receiving step, in the control signal generating step, a control signal for selecting a predetermined content display-playback apparatus on the basis of the selection-history information stored in the storing step and transmitting the content from the content providing apparatus to the selected content display-playback apparatus for display and playback is generated, such that a display-playback apparatus having a highest frequency of being selected is automatically selected by default for display and playback, wherein one of content-display-playback-and-operation-control apparatuses, each having a content display-playback function, is used as the operation control apparatus, in the control signal generating step, a predetermined content-display-playback-and-operation-control apparatus or content display-playback apparatus is selected on the basis of selection-history information of the content-display-playback-and-operation-control apparatuses and the content display-playback apparatuses, and when the operation control apparatus performs a playback-control operation for requesting one content display-playback apparatus to perform playback, depending on at least a present operating state of the one content display-playback apparatus, the one content display-playback apparatus determines whether to be controlled by the playback-control operation, the present operating state indicating a status of displaying and playing back of content by the one content display-playback apparatus by a user.

11. A portable operation control apparatus for use in a system for transmitting content from a content providing apparatus to content display-playback apparatuses for display and playback through a network by wirelessly communicating with the content providing apparatus and the content display-playback apparatuses, the operation control apparatus comprising, in a same housing:

an input operation reception unit configured to receive an operation input from a user;

a control signal generation unit configured to generate a control signal for transmitting and receiving the content among the content providing apparatus, the content display-playback apparatuses, and the operation control apparatus in response to the operation input received by the input operation reception unit; and a storage unit which stores selection-history information of the content display-playback apparatuses, the selection-history information including a list of the content display-playback apparatuses arranged in an order of frequency of being historically selected to display and play back content transmitted from the content providing apparatus by the control signal generating unit, wherein, when the input operation reception unit receives an operation input for transmitting the content from the content providing apparatus to the content display-playback apparatus for display and playback, the control signal generating unit generates a control signal for selecting a predetermined content display-playback apparatus on the basis of the selection-history information stored in the storage unit and transmitting the content from the content providing apparatus to the selected content display-playback apparatus for display and playback, such that a display-playback apparatus having a highest frequency of being selected is automatically selected by default for display and playback, wherein one of content-display-playback-and-operation-control apparatuses each having a content display-playback function is used as the operation control apparatus, the control signal generating unit selects a predetermined content-display-playback-and-operation-control apparatus or content display-playback apparatus on the basis of selection-history information of the content-display-playback-and-operation-control apparatuses and the content display-playback apparatuses, and when the operation control apparatus performs a playback-control operation for requesting one content display-playback apparatus to perform playback, depending on at least a present operating state of the one content display-playback apparatus, the one content display-playback apparatus determines whether to be controlled by the playback-control operation, the present operating state indicating a status of displaying and playing back of content by the one content display-playback apparatus by a user.

* * * * *